(12) United States Patent
Lockett et al.

(10) Patent No.: US 9,416,290 B2
(45) Date of Patent: Aug. 16, 2016

(54) NICKEL INKS AND OXIDATION RESISTANT AND CONDUCTIVE COATINGS

(71) Applicant: NthDegree Technologies Worldwide Inc., Tempe, AZ (US)

(72) Inventors: Vera N. Lockett, Phoenix, AZ (US); Alexandra E. Hartman, Tolleson, AZ (US); John G. Gustafson, Chandler, AZ (US); Mark D. Lowenthal, Gilbert, AZ (US); William J. Ray, Fountain Hills, AZ (US); Leila Daneshi, Phoenix, AZ (US)

(73) Assignee: NthDegree Technologies Worldwide Inc., Tempe, AZ (US)

( * ) Notice: Subject to any disclaimer, the term of this patent is extended or adjusted under 35 U.S.C. 154(b) by 0 days.

(21) Appl. No.: 14/655,557

(22) PCT Filed: Dec. 27, 2013

(86) PCT No.: PCT/US2013/078059
§ 371 (c)(1),
(2) Date: Jun. 25, 2015

(87) PCT Pub. No.: WO2014/106088
PCT Pub. Date: Jul. 3, 2014

(65) Prior Publication Data
US 2015/0353753 A1    Dec. 10, 2015

Related U.S. Application Data

(60) Provisional application No. 61/747,093, filed on Dec. 28, 2012.

(51) Int. Cl.
*C09D 11/52* (2014.01)
*C09D 11/037* (2014.01)
(Continued)

(52) U.S. Cl.
CPC . *C09D 11/52* (2013.01); *C08K 3/04* (2013.01); *C08K 3/08* (2013.01); *C08K 5/053* (2013.01);
(Continued)

(58) Field of Classification Search
CPC .... C09D 11/52; C09D 11/037; C09D 11/104; C08K 2003/0862; C08K 3/04; C08K 3/08; C08K 5/053; C08K 5/092
USPC .......... 106/31.92; 252/503, 510, 513
See application file for complete search history.

(56) References Cited

U.S. PATENT DOCUMENTS 4,371,459 A * 2/1983 Nazarenko ............. C09D 11/52
106/1.14
4,406,826 A   9/1983 Morgan et al.
(Continued)

FOREIGN PATENT DOCUMENTS

CN    101792627    8/2010
CN    101805538    8/2010
(Continued)

*Primary Examiner* — Helene Klemanski
(74) *Attorney, Agent, or Firm* — Knobbe, Martens, Olson & Bear, LLP

(57) ABSTRACT

A conductive ink may include a nickel component, a polycarboxylic acid component, and a polyol component, the polycarboxylic acid component and the polyol component being reactable to form a polyester component. The polyester component may be formed in situ in the conductive ink from a polyol component and a polycarboxylic acid component. The conductive ink may include a carbon component. The conductive ink may include an additive component. The conductive ink may include nickel flakes, graphene flakes, glutaric acid, and ethylene glycol. The conductive ink may be printed (e.g., screen printed) on a substrate and cured to form a conductive film. A conductive film may include a nickel component and a polyester component.

20 Claims, 1 Drawing Sheet

(51) Int. Cl.
*C09D 11/104* (2014.01)
*C08K 3/04* (2006.01)
*C08K 3/08* (2006.01)
*C08K 5/053* (2006.01)
*C08K 5/092* (2006.01)

(52) U.S. Cl.
CPC .............. *C08K 5/092* (2013.01); *C09D 11/037* (2013.01); *C09D 11/104* (2013.01); *C08K 2003/0862* (2013.01)

(56) References Cited

U.S. PATENT DOCUMENTS

| | | | |
|---|---|---|---|
| 6,398,861 B1 | 6/2002 | Knox | |
| 6,440,331 B1 * | 8/2002 | Carano | C25D 5/56 252/503 |
| 7,189,341 B2 * | 3/2007 | Li | C09D 11/52 106/31.92 |
| 7,655,161 B2 | 2/2010 | Cho et al. | |
| 7,938,901 B2 | 5/2011 | Wheeler et al. | |
| 7,968,011 B2 * | 6/2011 | Overbeek | C09D 11/52 252/503 |
| 2003/0151030 A1 * | 8/2003 | Gurin | C09K 5/10 252/503 |
| 2004/0178391 A1 | 9/2004 | Conaghan et al. | |
| 2005/0247916 A1 | 11/2005 | McCormick et al. | |
| 2007/0261596 A1 | 11/2007 | Fechner et al. | |
| 2009/0258202 A1 * | 10/2009 | Sakaguchi | C09D 11/52 106/31.92 |
| 2009/0293766 A1 | 12/2009 | Kamikoriyama et al. | |
| 2011/0065228 A1 | 3/2011 | Li | |
| 2012/0111599 A1 * | 5/2012 | Roberson | H01B 1/04 252/503 |
| 2012/0142832 A1 | 6/2012 | Varma et al. | |
| 2014/0099528 A1 | 4/2014 | Lockett et al. | |
| 2014/0183421 A1 * | 7/2014 | Lockett | C09D 11/52 252/513 |

FOREIGN PATENT DOCUMENTS

| | | |
|---|---|---|
| CN | 101935483 | 1/2011 |
| CN | 102786838 | 11/2012 |
| EP | 130010 | 1/1985 |
| EP | 0307551 | 3/1989 |
| EP | 2208765 | 7/2010 |
| FR | 2183873 | 12/1973 |
| JP | 63-057677 | 3/1988 |
| JP | 2002-133944 | 5/2002 |
| JP | 2002-208534 | 7/2002 |
| JP | 2005-023415 | 1/2005 |
| JP | 2005-097326 | 4/2005 |
| JP | 2006-161128 | 6/2006 |
| JP | 2006-348160 | 12/2006 |
| JP | 2008-127657 | 6/2008 |
| JP | 2008-153136 | 7/2008 |
| JP | 2010-238825 | 10/2010 |
| KR | 2011063039 | 6/2011 |
| KR | 2012080878 | 7/2012 |
| KR | 2012098157 | 9/2012 |
| WO | WO 2006/070747 | 7/2006 |
| WO | WO 2006/135113 | 12/2006 |
| WO | WO 2007/116649 | 10/2007 |
| WO | WO 2007/052564 | 5/2010 |

* cited by examiner

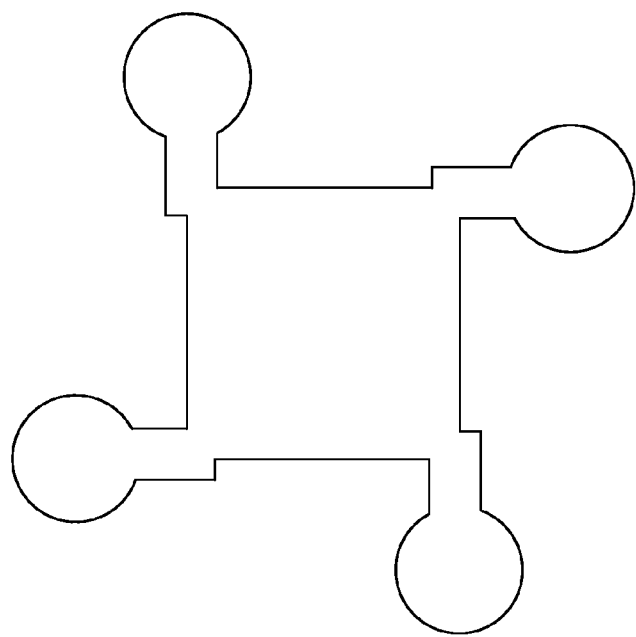
FIG. IA
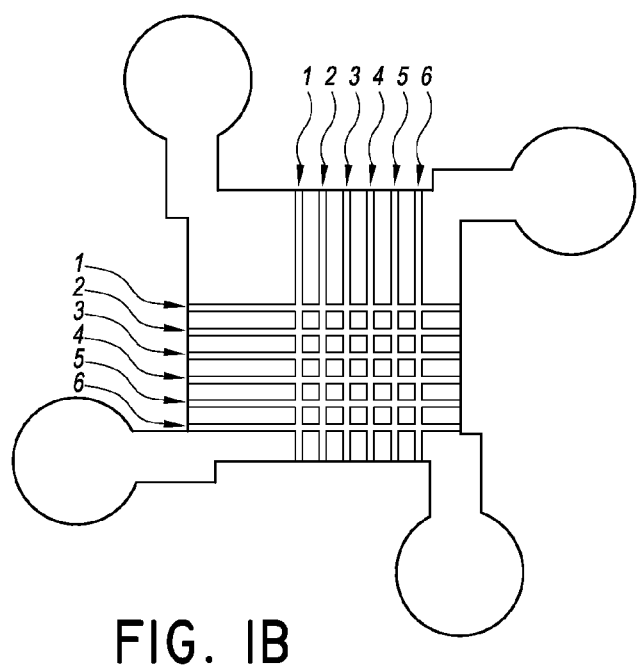
FIG. IB

NICKEL INKS AND OXIDATION RESISTANT AND CONDUCTIVE COATINGS

CROSS REFERENCE TO RELATED APPLICATIONS

This application is a United States national stage under 35 U.S.C. §371 of PCT Patent Application No. PCT/US2013/078059, entitled "NICKEL INKS AND OXIDATION RESISTANT AND CONDUCTIVE COATINGS," filed Dec. 27, 2013, which claims the benefit of U.S. Provisional Patent Application Serial No. 61/747,093, filed Dec. 28, 2012, entitled "NICKEL INKS AND OXIDATION RESISTANT AND CONDUCTIVE COATINGS," each of which is incorporated herein by reference in its entirety.

BACKGROUND

1. Field

This application relates to a conductive ink, particularly to a conductive ink including nickel.

2. Description of the Related Art

The most common and highest performing conductive inks available on the market are silver inks. The biggest downside of these inks is cost due to silver content (varying from 1 to 2 dollars per gram). Copper inks are also available and are cheaper than silver inks; however, the copper inks themselves and the films printed using the copper inks are prone to oxidation and corrosion.

Nickel (Ni) has inherent metal conductivity, high resistance to oxidation and other types of corrosion, and is magnetic. Based on these properties, Ni inks find applications in many areas including conductive inks, decorative metallic paints, corrosion resistant coatings, antistatic coatings, and in radio frequency and electromagnetic shielding coatings.

Conductive screen printable Ni inks available on the market have a range of sheet resistance between about 5 Ohm/sq/mil and about 300 Ohm/sq/mil, which is relatively high compared to what one would expect from a metal ink. The relatively low conductivity of existing Ni inks might also explain why there are not many suppliers of such materials (e.g., existing suppliers include Creative Materials, Corp., Gwent Electronic Materials, Ltd., Engineered Conductive Materials, LLC, and Epoxies, etc.). There are also existing suppliers producing ink-jet printable nano Ni inks (e.g., Applied Nanotech Holdings, Inc.). Although, nanoinks cured at temperatures above 300° C. are highly conductive (e.g., they can become a thin metal film after curing), they are expensive and not applicable where a thicker coating or lower curing temperatures are needed. They are also more difficult to produce in large quantities due to the nanomaterials.

Therefore, there is a need for Ni ink having improved properties.

SUMMARY

A conductive ink may include a nickel component, a polycarboxylic acid component, and a polyol component, the polycarboxylic acid component and the alcohol polyol component being reactable to form a polyester component. The conductive ink may include an additive component and/or a carbon component.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component can have at least one particle having a longest dimension in a range of about 0.5 microns to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polycarboxylic acid component can include a dicarboxylic acid. For example, the dicarboxylic acid may include at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, an octadecanedioic acid, a maleic acid, a fumaric acid, a glutaconic acid, a traumatic acid and a muconic acid.

In some embodiments, the polycarboxylic acid component can include a tricarboxylic acid. For example, the tricarboxylic acid may include at least one of a citric acid, an isocitric acid, an aconitic acid, a carballylic acid, a trimesic acid, and a terephthalic acid.

In some embodiments, the polycarboxylic acid component can include a hydroxicarboxilic acid. For example, the hydroxicarboxilic acid may include at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

The polyol component may include at least one of a glycerol and a glycol. In some embodiments, the polyol component can include at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

The additive component may include at least one of a viscosity modifier, a wetting agent, a flow and leveling agent, an adhesion promoter, and a corrosion inhibitor. For example, the wetting agent may include a polyethylene glycol. For example, the corrosion inhibitor may include at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

In some embodiments, the additive component includes a solvent. The solvent may include at least one of a viscosity modifier, a wetting agent, a flow and leveling agent, and an adhesion promoter. The solvent may include at least one of an alcohol and water. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the additive component may include a butyl lactone. In some embodiments, the additive component may include an ether. The ether may include at least one of a methyl ethyl ether, a diethyl ether, an ethyl propyl ether, and a polyether.

In some embodiments, the additive component can include a ketone. The ketone may include at least one of an acetone and a methyl ethyl ketone. In some embodiments, the ketone can include at least one of a diketone and a cyclic ketone. For example, the cyclic ketone may include at least one of a cyclohexanone, a cyclopentanone, a cycloheptanone, a cyclooctanone, a benzophenone, an acetylacetone, an acetophenone, a cyclopropanone, and an isophorone.

In some embodiments, the additive component can include an ester. The ester may include at least one of a dibasic ester, an ethyl acetate, a dimethyl adipate, a proplyene glycol monomethyl ether acetate, a dimethyl glutarate, a dimethyl succinate, a glycerin acetate, and a carboxylate.

In some embodiments, the additive component can include a carbonate. The carbonate may include a propylene carbonate.

In some embodiments, the additive component can include at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, a teradecane, a styrene, a 1-vinyl-2-pyrolidone, a toluene, a pyridine, and a triethyl phosphate.

In some embodiments, the conductive ink has a viscosity at about 25° C. in a range from about 5,000 centipoise to about 11,000 centipoise.

In some embodiments, the nickel component is in a range from about 50 wt % to about 60 wt %. In some embodiments, the nickel component is in a range from about 35 wt % to about 65 wt %.

In some embodiments, the carbon component is in a range from about 0.5 wt % to about 2.5 wt %. In some embodiments, the carbon component is less than about 10 wt %.

In some embodiments, the polycarboxylic acid component is in a range from about 5 wt % to about 15 wt %.

In some embodiments, the polyol component is in a range from about 25 wt % to about 40 wt %. In some embodiments, the polyol component is in a range from about 15 wt % to about 60 wt %.

In some embodiments, the additive component is less than about 10%.

A conductive film may include a nickel component and a polyester component. In some embodiments, the conductive film may include an additive component and/or a carbon component.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component of the conductive film can have at least one particle having a longest dimension in a range of about 100 nanometers to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component of the conductive film may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polyester component of the conductive film can be formed in situ from a polycarboxylic acid component and a polyol component.

In some embodiments, the conductive film has a sheet resistance in a range from about 0.5 ohm/sq/mil to about 1.5 ohm/sq/mil. In some embodiments, the conductive film has a thickness in a range from about 4 microns to about 40 microns.

The conductive film may be printed onto a substrate. Suitable substrates may include a conductive substrate or a non-conductive substrate. The substrate may include at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

A method of fabricating a conductive ink may include dispersing a nickel component in a solvent component, and dispersing a polyester component in the solvent component.

The method of fabricating the conductive ink may include dispersing a carbon component in the solvent component. Dispersing the nickel component in the solvent component may be before dispersing the polyester component in the solvent component. Dispersing the nickel component in the solvent component may be after dispersing the polyester component in the solvent component.

Dispersing the nickel component in the solvent component may be before dispersing the carbon component in the solvent component. In some embodiments, dispersing the nickel component in the solvent component can be after dispersing the carbon component in the solvent component.

In some embodiments, dispersing the carbon component in the solvent component can be before dispersing the polyester component in the solvent component. In some embodiments, dispersing the carbon component in the solvent component can be after dispersing the polyester component in the solvent component.

The method of fabricating the conductive ink can include adding an additive component to the solvent component.

Adding the additive component to the solvent component may be before dispersing the nickel component in the solvent. Adding the additive component to the solvent component may be after dispersing the nickel component in the solvent. Adding the additive component to the solvent component may be before dispersing the polyester component in the solvent. In some embodiments, adding the additive component to the solvent component can be after dispersing the polyester component in the solvent. In some embodiments, adding the additive component to the solvent component can be before dispersing the carbon component in the solvent. In some embodiments, adding the additive component to the solvent component can be after dispersing the carbon component in the solvent.

The conductive ink may be printable onto a substrate. Suitable substrates may include a conductive substrate or a non-conductive substrate. The substrate may include at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component of the conductive ink can have at least one particle having a longest dimension in a range of about 100 nanometers to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component of the conductive ink may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polyester component can be formed from a polycarboxylic acid component and a polyol component.

In some embodiments, the polycarboxylic acid component can include a dicarboxylic acid. For example, the dicarboxylic acid may include at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, an octadecanedioic acid, a maleic acid, a fumaric acid, a glutaconic acid, a traumatic acid and a muconic acid.

In some embodiments, the polycarboxylic acid component can include a tricarboxylic acid. For example, the tricarboxylic acid may include at least one of a citric acid, an isocitric acid, an aconitic acid, a carballylic acid, a trimesic acid, and a terephthalic acid.

In some embodiments, the polycarboxylic acid component can include a hydroxicarboxilic acid. For example, the hydroxicarboxilic acid may include at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

The polyol component may include at least one of a glycerol and a glycol. In some embodiments, the polyol component can include at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

The additive component may include at least one of a viscosity modifier, a wetting agent, a flow and leveling agent, an adhesion promoter, and a corrosion inhibitor. For example, the wetting agent may include a polyethylene glycol. For example, the corrosion inhibitor may include at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

In some embodiments, the additive component includes a solvent. The solvent may include at least one of a viscosity modifier, a wetting agent, a flow and leveling agent, and an adhesion promoter. The solvent may include at least one of an alcohol and water. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the additive component may include a butyl lactone. In some embodiments, the additive component may include an ether. The ether may include at least one of a methyl ethyl ether, a diethyl ether, an ethyl propyl ether, and a polyether.

In some embodiments, the additive component can include a ketone. The ketone may include at least one of an acetone and a methyl ethyl ketone. In some embodiments, the ketone can include at least one of a diketone and a cyclic ketone. For example, the cyclic ketone may include at least one of a cyclohexanone, a cyclopentanone, a cycloheptanone, a cyclooctanone, a benzophenone, an acetylacetone, an acetophenone, a cyclopropanone, and an isophorone.

In some embodiments, the additive component can include an ester. The ester may include at least one of a dibasic ester, an ethyl acetate, a dimethyl adipate, a propylene glycol monomethyl ether acetate, a dimethyl glutarate, a dimethyl succinate, a glycerin acetate, and a carboxylate.

In some embodiments, the additive component can include a carbonate. The carbonate may include a propylene carbonate.

In some embodiments, the additive component can include at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, a teradecane, a styrene, a 1-vinyl-2-pyrolidone, a toluene, a pyridine, and a triethyl phosphate.

In some embodiments, the conductive ink can have a viscosity at about 25° C. in a range from about 5,000 centipoise to about 11,000 centipoise.

In some embodiments, the nickel component is in a range from about 50 wt % to about 60 wt %. In some embodiments, the method of any one of embodiments 80 to 143, wherein the nickel component is in a range from about 35 wt % to about 65 wt %.

In some embodiments, the carbon component is in a range from about 0.5 wt % to about 2.5 wt %. In some embodiments, the carbon component is less than about 10 wt %.

In some embodiments, the additive component is less than about 10 wt %.

A method of fabricating a conductive film may include printing a conductive ink on a substrate. The conductive ink may include a nickel component, and a polyester component. In some embodiments, the method of fabricating the conductive film can include curing the printed conductive ink.

Printing the conductive ink may include at least one of a screen printing process, a coating process, a rolling process, a spraying process, a layering process, a spin coating process, a lamination process, an affixing process, an inkjet printing process, an electro-optical printing process, an electroink printing process, a resist printing process, a thermal printing process, a laser jet printing process, a magnetic printing process, a pad printing process, a flexographic printing process, a hybrid offset lithography process, a intaglio printing process, and a die slot deposition process.

The screen printing process may include using a polyester screen. The screen printing process may include using a polyamide screen. The screen printing process may include using a screen having a mesh size of about 110 or about 135.

The conductive ink may be printable onto a substrate. Suitable substrates may include a conductive substrate or a non-conductive substrate. The substrate may include at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

In some embodiments, curing the printed conductive ink can include heating the printed conductive ink and the substrate to a temperature in a range from about 100° C. to about 200° C. Curing the printed conductive ink may include heating the printed conductive ink and the substrate to a temperature in a range from about 130° C. to about 140° C.

In some embodiments, curing the printed conductive ink can include heating the printed conductive ink and the substrate for a duration from about 20 seconds to about 1 hour. In some embodiments, curing the printed conductive ink can include heating the printed conductive ink and the substrate for a duration from about 3 minutes to about 10 minutes.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component of the conductive film can have at least one particle having a longest dimension in a range of about 0.5 microns to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component of the conductive film may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polyester component can be formed from a polycarboxylic acid component and a polyol component.

In some embodiments, the polycarboxylic acid component can include a dicarboxylic acid. For example, the dicarboxylic acid may include at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid, a maleic acid, a fumaric acid, a glutaconic acid, a traumatic acid and a muconic acid.

In some embodiments, the polycarboxylic acid component can include a tricarboxylic acid. For example, the tricarboxylic acid may include at least one of a citric acid, an isocitric acid, an aconitic acid, a carballylic acid, a trimesic acid, and a terephthalic acid.

In some embodiments, the polycarboxylic acid component can include a hydroxicarboxilic acid. For example, the hydroxicarboxilic acid may include at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

The polyol component may include at least one of a glycerol and a glycol. In some embodiments, the polyol component can include at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

In some embodiments, the conductive ink can include an additive component.

The additive component may include at least one of a viscosity modifier, a wetting agent, a flow and leveling agent, an adhesion promoter, and a corrosion inhibitor. For example, the wetting agent may include a polyethylene glycol. For example, the corrosion inhibitor may include at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

In some embodiments, the additive component includes a solvent. The solvent may include at least one of a viscosity modifier, a wetting agent, a flow and leveling agent, and an adhesion promoter. The solvent may include at least one of an alcohol and water. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the additive component may include a butyl lactone. In some embodiments, the additive component may include an ether. The ether may include at least one of a methyl ethyl ether, a diethyl ether, an ethyl propyl ether, and a polyether.

In some embodiments, the additive component can include a ketone. The ketone may include at least one of an acetone and a methyl ethyl ketone. In some embodiments, the ketone can include at least one of a diketone and a cyclic ketone. For example, the cyclic ketone may include at least one of a cyclohexanone, a cyclopentanone, a cycloheptanone, a cyclooctanone, a benzophenone, an acetylacetone, an acetophenone, a cyclopropanone, and an isophorone.

In some embodiments, the additive component can include an ester. The ester may include at least one of a dibasic ester, an ethyl acetate, a dimethyl adipate, a proplyene glycol monomethyl ether acetate, a dimethyl glutarate, a dimethyl succinate, a glycerin acetate, and a carboxylate.

In some embodiments, the additive component can include a carbonate. The carbonate may include a propylene carbonate.

In some embodiments, the additive component can include at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, a teradecane, a styrene, a 1-vinyl-2-pyrolidone, a toluene, a pyridine, and a triethyl phosphate.

The conductive ink comprises a viscosity at 25° C. in a range from about 5,000 centipoise to about 11,000 centipoise.

In some embodiments, the nickel component of the conductive film can be in a range from about 50 wt % to about 60 wt %. In some embodiments, the nickel component can be is in a range from about 35 wt % to about 65 wt %.

In some embodiments, the carbon component can be in a range from about 0.5 wt % to about 2.5 wt %. In some embodiments, the carbon component of the conductive film can be less than about 10 wt %.

In some embodiments, the additive component can be less than about 10 wt %.

A method of fabricating a conductive ink may include dispersing a nickel component in an alcohol polyol component, and dispersing an polycarboxylic acid component in the alcohol polyol component, where the polycarboxylic acid component and the alcohol polyol component are reactable to form a polyester component.

In some embodiments, dispersing the polycarboxylic acid component in the polyol component forms the polyester component in situ.

In some embodiments, the method of fabricating a conductive ink can include dispersing a carbon component in the polyol component.

Dispersing the nickel component in the polyol component can be before dispersing the polycarboxylic acid component in the polyol component. Dispersing the nickel component in the polyol component can be after dispersing the polycarboxylic acid component in the polyol component.

In some embodiments, dispersing the nickel component in the polyol component can be before dispersing the carbon component in the polyol component. In some embodiments, dispersing the nickel component in the polyol component can be after dispersing the carbon component in the polyol component.

In some embodiments, dispersing the carbon component in the polyol component can be before dispersing the polycarboxylic acid component in the polyol component. In some embodiments, dispersing the carbon component in the polyol component can be after dispersing the polycarboxylic acid component in the polyol component.

The method of fabricating a conductive ink can include adding an additive component.

In some embodiments, adding the additive component can be before dispersing the nickel component in the polyol component. In some embodiments, adding the additive component can be after dispersing the nickel component in the polyol component. In some embodiments, adding the additive component can be before dispersing the polycarboxylic acid component in the polyol component. In some embodiments, adding the additive component can be after dispersing the polycarboxylic acid component in the polyol component. In some embodiments, adding the additive component can be before dispersing the carbon component in the polyol component. In some embodiments, adding the additive component can be after dispersing the carbon component in the polyol component.

The conductive ink may be printable onto a substrate. Suitable substrates may include a conductive substrate or a non-conductive substrate. For example, a substrate may include at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component can have at least one particle having a longest dimension in a range of about 0.5 microns to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polycarboxylic acid component can include a dicarboxylic acid. For example, the dicarboxylic acid may include at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid, a maleic acid, a fumaric acid, a glutaconic acid, a traumatic acid and a muconic acid.

In some embodiments, the polycarboxylic acid component can include a tricarboxylic acid. For example, the tricarboxylic acid may include at least one of a citric acid, an isocitric acid, an aconitic acid, a carballylic acid, a trimesic acid, and a terephthalic acid.

In some embodiments, the polycarboxylic acid component can include a hydroxicarboxilic acid. For example, the hydroxicarboxilic acid may include at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

The polyol component may include at least one of a glycerol and a glycol. In some embodiments, the polyol component can include at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

The additive component may include at least one of a viscosity modifier, a wetting agent, a flow and leveling agent, an adhesion promoter, and a corrosion inhibitor. For example, the wetting agent may include a polyethylene glycol. For example, the corrosion inhibitor may include at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

In some embodiments, the additive component includes a solvent. The solvent may include at least one of a viscosity modifier, a wetting agent, a flow and leveling agent, and an adhesion promoter. The solvent may include at least one of an alcohol and water. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the additive component may include a butyl lactone. In some embodiments, the additive component may include an ether. The ether may include at least one of a methyl ethyl ether, a diethyl ether, an ethyl propyl ether, and a polyether.

In some embodiments, the additive component can include a ketone. The ketone may include at least one of an acetone and a methyl ethyl ketone. In some embodiments, the ketone can include at least one of a diketone and a cyclic ketone. For example, the cyclic ketone may include at least one of a cyclohexanone, a cyclopentanone, a cycloheptanone, a cyclooctanone, a benzophenone, an acetylacetone, an acetophenone, a cyclopropanone, and an isophorone.

In some embodiments, the additive component can include an ester. The ester may include at least one of a dibasic ester, an ethyl acetate, a dimethyl adipate, a proplyene glycol monomethyl ether acetate, a dimethyl glutarate, a dimethyl succinate, a glycerin acetate, and a carboxylate.

In some embodiments, the additive component can include a carbonate. The carbonate may include a propylene carbonate.

In some embodiments, the additive component can include at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, a teradecane, a styrene, a 1-vinyl-2-pyrolidone, a toluene, a pyridine, and a triethyl phosphate.

In some embodiments, the conductive ink has a viscosity at about 25° C. in a range from about 5,000 centipoise to about 11,000 centipoise.

In some embodiments, the nickel component is in a range from about 50 wt % to about 60 wt %. In some embodiments, the nickel component is in a range from about 35 wt % to about 65 wt %.

In some embodiments, the carbon component is in a range from about 0.5 wt % to about 2.5 wt %. In some embodiments, the carbon component is less than about 10 wt %.

In some embodiments, the polycarboxylic acid component is in a range from about 5 wt % to about 15 wt %.

In some embodiments, the polyol component is in a range from about 25 wt % to about 40 wt %. In some embodiments, the polyol component is in a range from about 15 wt % to about 60 wt %.

In some embodiments, the additive component is less than about 10%.

In some embodiments, a printed conductive nickel film can be fabricated using a nickel ink prepared according to a method described herein. In some embodiments, the conductive nickel film can have a sheet resistance of less than about 1.5 Ohms per square per mil (Ohms/sq/mil). In some embodiments, the conductive nickel film can have a sheet resistance of less than about 1.0 Ohms/sq/mil. In some embodiments, the conductive nickel film can have a surface roughness of less than about 10. In some embodiments, the conductive nickel film can have polar liquid phobicity. In some embodiments, the conductive nickel film can have hydrophobicity. In some embodiments, the conductive nickel film can have an adhesion value of less than 3. In some embodiments, the conductive nickel film can have a viscosity of about 9,000 centipoise (cP) at a temperature of about 25° C.

In some embodiments, a conductive ink can include a nickel component, a polycarboxylic acid component, and a polyol component. In some embodiments, the polycarboxylic acid component and the polyol component can be reactable to form a polyester component.

In some embodiments, the nickel component can include nickel flakes. In some embodiments, the polycarboxylic acid component can include glutaric acid and the polyol component can include ethylene glycol.

In some embodiments, a nickel film printed using the conductive ink can have a sheet resistance of about 0.4 Ohms per square per 0.001 inch (mil) (together, Ohms/sq/mil) to about 0.5 Ohms/sq/mil.

In some embodiments, the conductive ink can include a polar liquid phobicity additive. The polar liquid phobicity additive may include dimer diamine.

In some embodiments, the conductive ink can include a printability enhancing additive. The printability enhancing additive may include styrene. In some embodiments, the printability enhancing additive can include a peroxide. The peroxide can include at least one of a benzoyl peroxide, a 2-butanol peroxide, a 2,4-chlorobenzoyl peroxide, and a lauryl peroxide.

In some embodiments, the polycarboxylic acid component can include at least one of a maleic acid, a fumaric acid, a glutaconic acid, a traumatic acid and a muconic acid. In some embodiments, the polyol component can include an unsaturated diol. In some embodiments, the polyester component can include an unsaturated polyester component. In some embodiments, the conductive ink can include graphene flakes.

In some embodiments, a method of fabricating a conductive ink can include dispersing a nickel component in a polyol component, and dispersing a polycarboxylic acid component in the polyol component. In some embodiments, the polycarboxylic acid component and the polyol component can be reactable to form a polyester component.

In some embodiments, the polycarboxylic acid component can include glutaric acid and the polyol component can include ethylene glycol.

In some embodiments, the nickel component can include nickel flakes.

In some embodiments, the method of fabricating the conductive ink can include removing nickel oxide from one or more surfaces of the nickel flakes. Removing the nickel oxide can include heating the nickel flakes in the presence of the polycarboxylic acid component. In some embodiments, heating can include heating the nickel flakes and the polycarboxylic acid component to a temperature of about 80° C. to about 120° C.

In some embodiments, the method of fabricating the conductive ink can include adding a polar liquid phobicity additive. The polar liquid phobicity additive may include dimer diamine.

In some embodiments, the method of fabricating the conductive ink can include mixing the nickel component with mixing media for reducing a nickel component particle size, where the mixing media can include beads. In some embodiments, the beads can include zirconia beads having a diameter of about 0.3 millimeters (mm) to about 10 mm. In some embodiments, the method of fabricating the conductive ink can include mixing the nickel component with the zirconia beads for a duration of between about 1 hour and about 2 days. In some embodiments, the mixture comprising the nickel flakes and zirconia beads having a diameter of about 0.3 mm to about 10 mm, including about 1 mm to about 10 mm, about 1 mm to about 5 mm, and about 5 mm to about 10 mm can be rotated for at least about 1 hour (hr) to about 3 days, including about 1 hour to about 2 days, about 1 hr to about 1 day, about 1 hr to about 12 hr, about 12 hr to about 1 day, and about 1 day to about 2 days.

In some embodiments, the method can include mixing the mixing media and the nickel component in a jar mill. The jar mill may have a diameter of about 3 inches to about 15 inches. In some embodiments, the method can include rotating the jar mill at a rotation speed of about 50 revolutions per minute (RPM) to about 200 RPM.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

FIG. 1A is a plan view of a nickel ink printed in a design usable to determine a sheet resistance of the printed nickel ink by van der Pauw measurement.

FIG. 1B is a plan view of a nickel ink printed in a design after performance of a tape test for measuring adhesion.

DETAILED DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

In some embodiments, a conductive ink comprises a nickel flake, which has a relatively low cost (e.g., about $0.01 per gram to about $0.05 per gram). In some embodiments, the ink, and/or the film printed using the ink, has good adherence to many types of substrates and/or can be completely cured at about 130° C. to about 140° C. and higher temperatures for a duration of about 3 minutes (min) to about 10 min. The ink's viscosity may be designed for screen printing and may be in the range of about 5,000 centipoise (cP) to about 11,000 cP at room temperature (about 25° C.). In some embodiments, the shelf life of the ink is at least about 3 months. In some embodiments, a printed film (e.g., printed from the conductive ink) or coating comprises a nickel component (e.g., nickel flakes), carbon component (e.g., graphene), and polyester. The printed film may have high conductivity (e.g., sheet resistance of less than about 1.5 Ohm/sq/mil, including less than 0.5 Ohm/sq/mil, including about 0.5 Ohm/sq/mil to about 1.5 Ohm/sq/mil). The coatings may have a thickness of about 4 microns (µm) to about 40 µm.

The ink may be designed for use in various layers of a printed energy storage device (e.g., as a current collector layer). Embodiments of example printed energy storage devices are provided in PCT Patent Application No. PCT/US2013/064309, filed Oct. 10, 2013, which is incorporated herein by reference in its entirety. See, for example, FIGS. 1 2, 7 and 8, and pages 22-31 and 33-47 of the PCT application.

In some embodiments, the conductive ink can be used as a conductive ink for other applications, for example an antistatic coating and/or in radio frequency and electromagnetic shielding coating.

In some embodiments, the conductive ink can facilitate an efficient portable energy storage system, which can help to enhance the use of stored power, reducing overall energy consumption. The conductive ink may be recyclable, for example because the components can be separated. In some embodiments, the conductive ink comprises components which are non-toxic such that, for example, the conductive ink can be disposed in a landfill without special procedures without adversely impacting the environment.

Example Composition and its Preparation Procedure

One embodiment of a composition of a conductive ink comprising nickel flake is presented in Table 1, along with the corresponding printing conditions in Table 2, and the parameters of the corresponding printed film are presented in Table 3.

The example ink composition presented in Table 1 was chosen by the parameters of the film printed from it (Table 3 shows the parameters). Adhesion of films to substrates was satisfactory on the majority of inks, so a key criterion for the ink composition presented in Table 1 was a balance between conductivity (described herein in terms of sheet resistance, Ohm/sq/mil) and smoothness of the printed film.

TABLE 1

Ink Composition

| | Ink Component | | | | |
|---|---|---|---|---|---|
| | Nickel | Carbon | Poly-carboxylic Acid | Polyol | Other additives |
| Variety | Flakes, 1 micron thick, 5-20 microns in diameter | Graphene flakes, 5 microns in diameter | Glutaric acid | Ethylene glycol | N/A |
| Weight Percent, wt % | 55.6 | 1.4 | 10.2 | 32.8 | None |

In some embodiments, the ink composition of Table 1 can be prepared using the following process: Graphene flakes are mixed with ethylene glycol and sonicated for 30 min at 90° C. to disperse the graphene flakes in the ethylene glycol. Nickel flakes are added to the mixture of graphene flakes and ethylene glycol, stirred with a stirrer (e.g., using a Lab Egg) for 10 min at 100° C. and sonicated for 30 min at 90° C. to disperse the Ni flakes in the ethylene glycol and with the graphene flakes. The graphene may be between nickel flakes (e.g., Ni-graphene-Ni), which can increase inter-particle contact and improve conductivity. The graphene may be between nickel flakes (e.g., Ni-graphene-Ni), which can reduce agglomeration. The mixture of graphene flakes, Ni flakes, and ethylene glycol is then heated to 100° C. and glutaric acid is added. The mixture of graphene flakes, Ni flakes, ethylene glycol, and glutaric acid is stirred (e.g., using a Lab Egg) for 30 min and cooled down.

In some embodiments, components of the ink may be combined at the same time (e.g., simultaneously or substantially simultaneously). For example, the graphene flakes, ethylene glycol, nickel flakes, and the glutaric acid may be combined at the same time to form a mixture. In some embodiments, the mixture can be heated after dispersion off all of the components. In some embodiments, the mixture can be heated to a temperature of about 80° C. to about 120° C. (e.g., about 100° C.), for example to inhibit or prevent formation of polymer before curing.

In some embodiments, a polyester may be formed upon mixing an alcohol and an acid. For example, a polyester may be formed upon heating of a mixture comprising an alcohol component and an acid component. In some embodiments, an ink mixture comprises a polyester component that is formed in situ (e.g., within or during formation of the ink, including for example during curing of the conductive ink to form a conductive film). In situ formation of the polyester component may provide a controllable process for the formation of the polyester component, may better disperse in the ink, and/or may increase interaction with nickel components, carbon components, and/or additives. In the ink, the acid can etch non-conductive materials such as nickel oxide from nickel components, which can increase conductivity since more conductive nickel is exposed. Once the acid is converted to polymer during curing, oxide is less likely to form on the nickel components, for example due to being at least partially surrounded by polymer. A polymer in an ink can inhibit printing or cause poor printability, and forming a polymer during curing after printing can advantageously avoid any impact of polymer in ink during printing.

In some embodiments, a polyester component can be formed external to the ink (e.g., made separately, purchased, etc.) and added directly. For example, fabricating a conductive nickel ink may include adding a polyester component a mixture instead of or in addition to forming the polyester component in situ. Adding a pre-formed polyester component to the ink may simplify the fabrication process by incorporating a known quantity and variety (e.g., average molecular weight, a polymer size, monomers and/or repeating units, etc.) of the polyester component. Polymer size may be adjusted, for example, to adjust printability.

The ink composition of Table 1 may be printed using a screen printing technique. An example of possible screen printing parameters are presented in Table 2.

TABLE 2

Printing Conditions

| Viscosity at 25° C., cP | Mesh type | Mesh size | Curing temperature, ° C. | Curing time, min |
|---|---|---|---|---|
| 9,000 | Polyester | 110 | 138 | 10 |

The parameters of the example printed film are presented in Table 3. The thickness measurement was conducted using an electronic thickness gauge. Sheet resistance was measured using the van der Pauw technique. For example, commonly practiced methods associated with the van der Pauw techniques may be applied to one or more printed conductive films described herein to evaluate a sheet resistance of the printed conductive film. For example, the ink printed in a special design, as shown in FIG. 1A, can be used when applying the van der Pauw technique to determine a sheet resistance.

To evaluate the adhesiveness of a printed nickel conductive film to a substrate, a cross-cut test may be used, including for example an ISO 2409 Cross Cut Test. A cross-cut test may be used to determine whether a printed film exhibits adequate adhesion to a substrate. In some embodiments, a cross-cut test can allow categorizing an adhesiveness of the printed film according to predetermined levels of adhesiveness.

In a cross-cut test, a lattice pattern having a set of six cuts in each of two directions may be made in a printed conductive nickel film. The six cuts in each set may be parallel or substantially parallel to one another. The first set of six cuts may be perpendicular or substantially perpendicular to the second set of six cuts. The cutting may be performed with a single blade knife and/or a multi-blade cutting tool. For example, a multi-blade cutting tool may have blades spaced about 1 millimeter or about 2 millimeters apart. Spacing of the cuts in each set of cuts may depend on a thickness of the printed conductive film and/or a hardness of the substrate on which the film is printed. For example, cuts spaced about 1 millimeter apart may be applied to a printed film having a thickness of less than about 60 microns and where the film is printed on a hard substrate. For example, cuts spaced about 2 millimeters apart may be applied to a printed film having a thickness of about 60 microns to about 120 microns and where the film is printed on a soft substrate. In some embodiments, cuts spaced about 3 millimeters apart can be applied to a printed film having a thickness of about 120 microns to about 250 microns and where the film is printed on either a hard or soft substrate. The cuts may penetrate through to the substrate on which the film is printed.

Pressure sensitive tape (e.g., an Elcometer ISO 2409 Adhesive Tape) can be applied over the cuts in the printed film and then pulled off. Adhesiveness of the printed film may be categorized according to predetermined levels of adhesiveness by comparing the appearance of the printed film after removing the pressure sensitive tape to description providing standards for each of the levels. The ISO 2409 Cross-cut test may allow categorizing adhesiveness of a printed film based on six predetermined levels, for example levels 0 through 5, level 0 corresponding to a high level of adhesiveness and level 5 corresponding a low level of adhesiveness. For example, level 0 may be appropriate if the printed film shows no detachment from the substrate after removal of the pressure sensitive tape. A level 1 may be appropriate if less than about 5% of a surface area (e.g., a percentage of a surface area over which the pressure sensitive film was applied) of the printed film detached from the substrate, level 2 if between about 5% to about 15% of the surface area detached, level 3 if between about 15% to about 35% of the surface area detached, and level 4 if between about 35% to about 65% of the surface area detached. A level 5 may be appropriate if detachment of the printed film is more severe than that described in level 4. FIG. 1B illustrates an example printed film after a cross-cut adhesion test, in which the film exhibits six vertical and horizontal striations. Although the pattern of FIG. 1B is also a pattern suitable for use with certain resistance measurements, a printed structure for an adhesion test may take any suitable pattern (e.g., tall and wide enough for the horizontal and vertical cuts).

TABLE 3

Printed Film Properties

| Substrate | Sheet Resistance, Ohm/sq/mil | Adhesion (0-5 range) |
|---|---|---|
| Biaxially-oriented polyethylene terephthalate (e.g., Mylar ®) | 0.8 | 1 |

Table 4 lists three examples of different nickel ink compositions: Nickel Ink 1, Nickel Ink 2, and Nickel Ink 3. Nickel Inks 1, 2, 3 each include a nickel component (in the form of nickel flakes), a carbon component (in the form of graphene flakes), a polycarboxylic acid component (in the form of glutaric acid), and a polyol component (in the form of ethylene glycol). Table 6 lists examples of parameters of nickel films printed using nickel inks having the compositions of Nickel Inks 1, 2 and 3 listed in Table 4.

As described above, Nickel Inks 1, 2, 3 can include other forms of the listed components. For example, Nickel Inks 1, 2, and/or 3 may include a polyol component and/or a polycarboxylic acid component (e.g., a dicarboxylic acid, such as maleic acid). In some embodiments, at least a portion of the polycarboxylic and the polyol can undergo chemical reaction to form polyester. In some embodiments, a nickel ink can include one or more additional components to facilitate providing an ink and/or a film printed using the ink having one or more desirable characteristics. Nickel Inks 1, 2, and 3 each include one or more additives, the possible effects of which are discussed in further detail below. Nickel Inks 1 and 2 includes benzoyl peroxide and styrene. Nickel Ink 3 does not include benzoyl peroxide or styrene. Nickel Inks 2 and 3 include dimer diamine and cyclohexanol. Nickel Ink 1 does not include dimer diamine or cyclohexanol. A solvent (e.g., an organic solvent such as cyclohexanol) can be selected based on a variety of factors, including for example ease of evaporation in an ink curing process.

TABLE 4

Ink Composition

| Ink Component | Nickel Ink 1 (wt %) | Nickel Ink 2 (wt %) | Nickel Ink 3 (wt %) |
|---|---|---|---|
| Nickel Nickel Flakes | 54.8 | 53.1 | 63 |
| Carbon Graphene Flakes, ~5 μm in diameter | 1.4 | 1.3 | 1.6 |
| Polycarboxylic Acid Glutaric Acid | 6.2 | 6.0 | 7.7 |
| Polyol Ethylene glycol | 19.9 | 19.3 | 24.7 |
| Benzoyl Peroxide | 8.1 | 7.8 | — |
| Styrene | 9.6 | 9.3 | — |
| Dimer Diamine | — | 1.9 | 2.0 |
| Solvent Cyclohexanol | — | 1.3 | 1.0 |

In some embodiments, a nickel ink can include one or more additives to facilitate providing an ink having improved printability (e.g., a printability enhancing additive, facilitating printing of an ink having a desired thickness, and/or smoothness, while providing an ink without or substantially without holes). For example, the nickel ink can include one or more components which can interact (e.g., including for example, a chemical reaction, such as a polymerization reaction) with the polyester, and/or one or more precursors of the polyester (e.g., the polycarboxylic acid and/or the polyol) to provide a stronger ink (e.g., an ink which can better withstand a tensile, twisting, compressive, and/or shear force). In some embodiments, the nickel ink can include styrene. For example, styrene can interact with the polyester and/or one or more of the polyester precursors to facilitate providing a stronger nickel ink. In some embodiments, the styrene can undergo a co-polymerization reaction with an unsaturated polyester and/or one or more of the unsaturated polyester precursors (e.g., a dicarboxylic acid, such as maleic acid, fumaric acid, glutaconic acid, traumatic acid and/or muconic acid; and/or an unsaturated diol). In some embodiments, the nickel ink can include an initiator to facilitate interaction between the styrene and the unsaturated polyester and/or one or more of the unsaturated polyester precursors (e.g., facilitate a co-polymerization reaction). For example, the nickel ink can include benzoyl peroxide for facilitating the co-polymerization reaction between styrene and the unsaturated polyester and/or one or more of the unsaturated polyester precursors (e.g., benzoyl peroxide as an activator for the co-polymerization reaction). Other suitable activators may be used, including for example, other suitable peroxides. Referring again to Table 4, Nickel Inks 1 and 2 include benzoyl peroxide and styrene.

In some embodiments, a nickel ink can include one or more additional components to facilitate providing an ink and/or a film having improved polar liquid phobicity, such as improved hydrophobicity (e.g., a polar liquid phobicity additive, for facilitating reduced absorption of water and/or other polar liquids by the ink and/or a film printed using the ink). The one or more additional components for facilitating an ink and/or a film having improved polar liquid phobicity can include a polymer and/or a polymer precursor, either or both of which can include a long hydrophobic chain (e.g., a long hydrocarbon chain). For example, the nickel ink can include dimer diamine to facilitate providing a nickel ink and/or film having improved polar liquid phobicity. In some embodiments, the dimer diamine can undergo a polymerization reaction with a polyester and/or one or more polyester precursors of the nickel ink. Referring again to Table 4, Nickel Inks 2 and 3 include dimer diamine.

In some embodiments, a nickel ink and/or film having polar liquid phobicity can demonstrate minimal, or no or substantially no absorption of ionic liquids used in various parts of an energy storage device. Energy storage devices may include one or more liquid components (e.g., an aqueous electrolyte, and/or one or more other components which can include an ionic liquid and/or any other liquid) which can be absorbed by the nickel film, adversely affecting an electrical performance of the nickel film, such as reducing an electrical conductivity of the nickel film. For example, an electrode and/or a separator of an energy storage device can include one or more ionic liquids. Embodiments of example energy storage devices which include an electrode and/or a separator comprising ionic liquid are provided in PCT Patent Application No. PCT/US2013/064309, filed Oct. 10, 2013, which is incorporated herein by reference in its entirety. See, for example, pages 24-26, 28-30, and 43-48 of the PCT application.

In some embodiments, the Nickel Inks 1, 2, and 3 of Table 4 can be prepared using the following process: glutaric acid and ethylene glycol are mixed until the glutaric acid is dissolved or substantially dissolved in the ethylene glycol. Nickel flakes and graphene flakes can then be added and mixed. For example, mixing and/or dispersing of the nickel flakes and graphene flakes within the mixture can be done by using a stirrer (e.g., using a Lab Egg) to stir the mixture for about 10 min at about 100° C., and/or by sonicating the mixture for about 30 min at about 90° C. As described herein, the graphene may be between nickel flakes (e.g., Ni-graphene-Ni), which can increase inter-particle contact, improve conductivity, and/or reduce agglomeration.

For nickel inks including one or more components to facilitate providing an ink having improved printability, the one or more components can be added to the mixture comprising the nickel and graphene flakes. For example, for Nickel Inks 1 and 2 of Table 4, styrene and benzoyl peroxide can be added to and/or mixed with the mixture comprising the nickel flakes and the graphene flakes.

In some embodiments, a nickel ink manufacturing procedure can include a process for reducing a nickel component particle size. For example, nickel flakes can undergo a process to reduce a size of the nickel flakes. In some embodiments, the nickel flakes and/or one or more other nickel ink components can undergo a mixing process using mixing media (e.g., in a jar mill, as described herein), which can break apart the nickel flakes and reduce a size of the nickel flakes. Other methods of reducing a nickel flake size may also be suitable. Other mixing apparatuses and/or mixing media may also be suitable to facilitate reducing the size of nickel flakes. For example a roller mill may also be suitable for mixing nickel flakes with mixing media. The nickel flakes can undergo the process for reducing a nickel flake size before and/or after combining the nickel flakes with one or more other components of the nickel ink (e.g., before and/or after combination of nickel flakes and graphene flakes with glutaric acid and ethylene glycol, such as mixing only nickel flakes with the mixing media). In some embodiments, nickel flake size may be reduced prior to adding the nickel flakes to a mixture. Performing a nickel flake size reduction process with the nickel flakes in a mixture (e.g., including one or more other nickel ink components) using a jar mill may advantageously facilitate reduced costs of fabricating a nickel film and/or nickel ink having increased smoothness and/or printability. In some embodiments, a jar mill can facilitate improved disintegration of agglomerated mixing media and/or agglomerated particles of the mixture being processed, and/or improve wetting of particles of the mixture being process. Mixing a mixture comprising the nickel flakes and one or more other nickel ink components with a mixing media may facilitate further dispersion of the nickel flakes within the mixture.

Nickel flakes having a smaller size can contribute to a smoother nickel ink and/or film (e.g., reduced roughness), and/or improve printability of the nickel ink (e.g., facilitate printing of thinner films). Smoother nickel ink and/or film may be desirable for various applications. For example, nickel ink and/or nickel film having reduced roughness may be desirable for electromagnetic shield applications, and/or use of nickel film on circuit boards of various electronic applications (e.g., as a cheaper alternative for other conductive materials, such as silver (Ag) containing materials, used on circuit boards).

In some embodiments, the nickel ink mixture can be mixed with a mixing media (e.g., beads, such as zirconia beads) in a jar mill. The mixing media can be removed from the mixture after completion of the mixing process, for example after nickel flakes of a desired size (e.g., average size, size range, etc.) is obtained. In some embodiments, a size of the mixing media can be selected to facilitate providing nickel flakes of a desired size. For example, a size of the zirconia beads (e.g., a diameter of spherical or substantially spherical beads) can be selected to provide nickel flakes of a desired diameter and/or a desired longest dimension. In some embodiments, a size of the nickel flakes can be directly proportional to a dimension of the mixing media (e.g., smaller sized mixing media can facilitate providing smaller nickel flakes). In some embodiments, zirconia beads having a diameter of about 5 millimeters (mm) to about 10 mm can provide nickel flakes having a diameter and/or longest dimension of about 10 microns (μm). Zirconia beads smaller than about 5 mm may provide smaller nickel flakes (e.g., nickel flakes having a diameter and/or longest dimension less than about 5 mm, such as about 0.3 mm to about 5 mm).

Reduced nickel flake particle size can facilitate increased smoothness (e.g., decreased roughness) of the nickel ink and/or nickel film printed using the nickel ink. Table 5 provides examples of roughness measurements of nickel films printed using the composition of Nickel Ink 1 of Table 4 where the nickel ink used for printing the films is prepared using mixing media of various sizes. For example, Table 5 shows that a roughness of the printed film increases with increase in size of mixing media used. Roughness measurements can be performed according to various methods know to those skilled in the art, including for example, a contact profilometer (e.g., a profilometer which contacts a nickel film surface with a stylus to measure a roughness of the nickel film surface) and/or non-contact profilometer (e.g., an optical profilometer).

TABLE 5

Examples of printed nickel film roughness and size of mixing media used in preparation of the corresponding nickel ink

| Mixing Media Size (Diameter), mm | Range of Roughness, μm |
|---|---|
| 5-10 | 5-10 |
| 2-5 | 3-7 |

Nickel flakes, and/or one or more other components of the nickel ink, and zirconia beads can be rotated in a jar mill at a rotational speed for a duration of time to provide nickel flakes of a desired size. Various rotational speeds may be suitable. Rotational speed of a jar mill can be depend on a variety of parameters, including for example, a geometry of the jar mill (e.g., size and/or shape) and/or a viscosity of the mixture being processed.

A rate at which nickel particles are broken apart (e.g., a rate of grinding) inside a jar mill can depend on the speed at which the mill cylinder of the jar mill is rotating. The mixture being processed and/or the mixing media within the jar mill moving in a cascade-like motion (e.g., cascading, or moving in a motion like that of a waterfall) may indicate that the rotating speed is providing a desired rate of grinding. In some embodiments, cascading can involve the mixture and/or the mixing media within the jar mill cylinder breaking away from an interior wall of the mill cylinder processing cavity at an angle of about 45 degrees to about 60 degrees relative to a horizontal reference line. Cascading of the mixture and/or the mixing media within the mill cylinder can facilitate falling and/or rolling of the mixing media and/or the mixture from the outer edges of the mill cylinder processing cavity in a coherent, mobile mass, for example creating an impact that fractures particles of the mixture (e.g., reducing a particle size of nickel flakes in the mixture). In some embodiments, secondary actions within the mill cylinder processing cavity involving the mixing media and/or the mixture which are not at the outer edges cataracting downward can contribute to further breaking apart of particles of the mixture, for example through rotational action of the mixing media and/or the mixture, and/or rubbing action between one or more interior surfaces of the mill cylinder processing cavity, the mixing media and/or the mixture. In some embodiments, cascading of the mixture and/or the mixing media, and secondary actions involving the mill cylinder, mixing media, and/or the mixture, can facilitate significantly improved reduction in particle size of the mixture, improved dispersion of components of the mixture, for example due to increased shear forces from spinning of the mixing media. In some embodiments, cascading of the mixture and/or the mixing media, and secondary actions involving the mill cylinder, mixing media, and/or the mixture, can facilitate increased wetting of particles of the mixture during a wet process.

In some embodiments, high rotational speeds of a mill cylinder can result in centrifuging of the mixture and/or the mixing media. For example, centrifuging of the mixture and/or the mixing media may result in separation of mixing media from particles of the mixture, for example contributing to un-ground or substantially un-ground material, uneven disintegration of particles of the mixture and/or uneven dispersion of particles within the mixture.

In some embodiments, slow rotational speeds of a mill cylinder can contribute to slipping of the mixing media and/or the mixture particles within the jar mill cylinder processing cavity, such as due to the mixing media and/or the mixture being processed becoming static relative to the walls of the rotating mill cylinder. Slipping of the mixing media and/or the mixture within a jar mill processing cavity can lead to undesirable wear of the jar mill and/or the mixing media, such as grooving of the interior of mill cylinder processing cavity walls and/or flattening of the mixing media. In some embodiments, slipping of the mixing media can occur if the jar mill is filled with insufficient quantity of mixture and/or mixing media. In some embodiments, slipping can occur due to low viscosity of the mixture that is being processed.

In some embodiments, lifter bars can be attached (e.g., welded and/or or bolted) to an interior surface of the mill cylinder processing cavity for reducing slippage. For example, lifter bars may be used when a combined volume of the mixture and the mixing media is below about 45 percent of the volume of the mill cylinder processing cavity. In some embodiments, use of lifter bars may be ineffective in reducing and/or preventing slipping of the mixing media and/or the mixture within the mill cylinder if a combined volume of the mixing media and mixture is too low, such as below about 33 percent of the volume of the mill cylinder processing cavity.

A critical rotational speed can be a speed at which an outermost layer of a mixture begins to centrifuge against an interior wall of the mill cylinder processing cavity. Critical rotational speed $N_c$ of a mill cylinder for processing a wet mixture, for example expressed in revolutions per minute (RPM), can be calculated using the following equation: $N_c=54.2/(\sqrt{R})=76.6/(\sqrt{D})$, where R is the interior radius of the mill cylinder processing cavity, and D is the interior diameter of the mill cylinder processing cavity (e.g., R and D may be expressed in feet). Critical rotational speed for processing a dry mixture can be estimated by increasing the $N_c$ value calculated above by about 2 RPM to about 5 RPM. A critical rotational speed may be independent of mixing media shape and/or density.

In some embodiments, the rotational speed of a mill cylinder can be about 35 percent to about 115 percent of the critical rotational speed $N_c$, including about 60 percent to about 65 percent of critical speed (Nc). In some embodiments, a jar mill can be rotated at varying speeds to facilitate optimized particle size reduction. For example, lower rates of rotation may be used for wet processing and/or dry processing of soft materials, such as compared to the rates of rotation used in wet processing of ceramic frits and glazes.

In some embodiments, higher rotational, such as speeds at or near critical speeds, can be used in manufacturing of metallic powders (e.g., bronze and aluminum powders). For example, such high speeds of rotation may facilitate flaking of the metallic powders due to powerful impact imparted upon metallic particles by the mixing media.

In some embodiments, a jar mill having a cylinder with a diameter of about 3 inches to about 15 inches can be used at rotational speeds between about 50 RPM and about 200 RPM to provide nickel flakes having desired particle sizes. For example, a rotational speed of about 80 RPM to about 150 RPM, about 100 RPM to about 120 RPM, can be used. As described herein, in some embodiments, the rotational speed of the jar mill may vary during the nickel flake particle size reduction process.

In some embodiments, optimizing a process for nickel particle size reduction can be comprise using mixing media having a reducing size. Smaller mixing media can facilitate increased contact per mill revolution and/or reduce a distance across which shear force may act, for example providing increased uniformity in nickel particle size and/or facilitating increased reduction of particle size. Larger mixing media can provide undesirably high impact energy upon particles of the mixture being processed and/or may generate heat in the jar mill if this increased energy is not efficiently consumed and/or dissipated. In some embodiments, larger mixing media can be useful to provide increased impact energy for breaking apart larger and/or or tougher particles in a mixture, and/or for processing a thixotropic wet mixtures.

In some embodiments, optimizing a viscosity of the mixture processed by the jar mill (e.g., depending on a particle size and/or a density of the mixing media and/or the mixture) can facilitate desired grinding of the mixture, while reducing wear of the mixing media (e.g., while keeping wear of the mixing media to a rate of about 20 percent per year). In some embodiments, viscosity of mixtures processed using high density mixing media can be higher than that processed using porcelain and/or flint mixing media, for example by about 25 percent, such as due to greater impact energy imparted upon the mixture by the high density mixing media.

In some embodiments, a mixture being processed having high viscosity may impede movement of mixing media within the mill, for example contributing to reduced grinding action. For example, excessively high viscosity may contribute to increased agglomeration of the mixing media such that the mixing media rotates together in a mass within the mill, significantly impeding grinding action.

In some embodiments, increased viscosity can be desirable, such as when operating a larger mill cylinder (e.g., mill cylinder having a larger diameter). A heavier-bodied cushion may be used to prevent wear due to increased weight of the mixing media. In some embodiments, operating a larger mill cylinder may involve use of increased horsepower for rotating the larger mill cylinder, the increased horse power being transformed into heat, which may lower the viscosity of the mixture (e.g., which may be accounted for to obtain optimized mixture viscosity).

Viscosity of the mixture being processed can be measured using various techniques known by one skilled in the art. For example, a Krebs Stormer® Viscometer (e.g., with the 52.2 mm seep flat paddle, Krebs' modification, commercially available from Thomas Scientific, of New Jersey), may be used for measuring viscosity. For example, a viscosity of about 600 centipoise (cP) to about 1,100 cP (e.g., about 70 Krebs Units (KU) to about 90 KU) can be used for a process using mixing media comprising flint pebbles and/or porcelain balls. For example, a viscosity over about 2,200 cP (e.g., over about 110 KU) can be used for a process using mixing media comprising high-density mixing media.

A desired combined volume occupied by a mixture and mixing media for facilitating desired particle size reduction in a jar mill can depend on a material of the mixing media. In some embodiments, it may be desirable for a mixture and mixing media to fill about 45 percent to about 55 percent of the total interior processing cavity volume of the mill cylinder, including from about 45 percent to about 50 percent. In some embodiments, a jar mill cylinder having two low a volume filled by a mixture and mixing media may contribute to increased wear on the mixing media and/or the interior surfaces of the mill cylinder processing cavity (e.g., due to slipping of the mixing media on one or more interior surfaces of the mill cylinder processing cavity). In some embodiments, a combined volume occupied by a mixture processed by a high-density ceramic mixing media and the mixing media itself, can be about 45 to about 50 percent of an interior processing cavity volume. In some embodiments, a combined volume occupied by a mixture processed by mixing media comprising flint pebbles and/or standard porcelain, and the mixing media itself, can be about 50 percent to about 55 percent of an interior processing cavity volume of a mill cylinder. For example, a wet processing porcelain enamel frit, about 50 percent to about 55 percent of an interior volume of a processing cavity can be filled, for example when using either standard and/or high-density mixing media. The frit charge (slip), expressed in pounds, may be equal to about three to about times four the total volume of the mill, expressed in gallons. If standard porcelain is used, the ratio of frit charge to volume may be about 3 to about 1. If high density alumina media is used, the ratio of frit charge to volume may be between about 3.5 to 1 and about 4.5 to 1. When steel balls are used, 33 percent and 45 to 50 percent ball charges may be used, depending upon the desired mill output. With 33 percent ball charges, lifter bars are recommended.

In some embodiments, for grinding of dry mixtures, an interior processing cavity of a jar mill cylinder filled to about 25 percent by volume by the mixture and about 25 percent by volume by the mixing media (e.g., half of the occupied volume in the mill is filled by the mixture and half is by the mixing media), may facilitate improved efficiency in contact between the mixture and the mixing media and/or one or more interior surfaces of the processing cavity.

In some embodiments, a volume occupied by mixing media and the mixture being processed within a processing cavity of a jar mill can be maintained at least about 25 percent total mill processing cavity volume, for example by initially filling the mill processing cavity to 30 percent to about 40 percent of its total volume. In some embodiments, a mixture an apparent volume of approximately 60 percent solid and 40 percent voids, for example providing a mill processing cavity about 50 percent full would have a capacity in the voids of 20 percent of the total mill volume.

In some embodiments, a duration of the mixing process can depend on an amount of mixture processed by the jar mill. For example, a longer duration of the mixing process may be used for processing an increased amount of mixture, and a shorter duration of the mixing process may be used for processing a decreased amount of mixture.

Increased duration of rotation may facilitate increased reduction in nickel flake size, facilitating nickel flakes having smaller dimensions. In some embodiments, the mixture comprising the nickel flakes and zirconia beads having a diameter of about 0.3 mm to about 10 mm, including about 1 mm to about 10 mm, about 1 mm to about 5 mm, and about 5 mm to about 10 mm can be rotated for at least about 1 hour (hr) to about 3 days, including about 1 hour to about 2 days, about 1 hr to about 1 day, about 1 hr to about 12 hr, about 12 hr to about 1 day, and about 1 day to about 2 days. For example, mixing media comprising zirconia beads having a 0.3 mm to about 5 mm can be rotated for a duration of up to about 2 days to provide nickel flakes having a diameter and/or longest dimension of about 10 µm. The longer the duration of rotation, the smaller nickel flake size may be achievable. A duration of rotation for achieving desired nickel particle size may decrease with a decreased viscosity of the mixture comprising the nickel flakes. In some embodiments, a viscosity of the mixture that is processed can be decreased by adding one or more solvents to the mixture. For example, a solvent comprising ethanol may be added to the mixture comprising the nickel flakes to decrease a viscosity of the mixture. The reduced viscosity mixture can be processed to reduce the size of nickel flakes therein. The solvent may subsequently be removed after the nickel flake size reduction process, such as by evaporation. For example, excess solvent may be evaporated until the nickel ink has a desired viscosity (e.g., solvent can be evaporated such that the nickel ink achieves a viscosity of about 9,000 cP). For another example, a viscosity of the mixture can be decreased by increasing a temperature of the mixture during the nickel flake size reduction process, such as maintaining the mixture at an elevated temperature during the process. In some embodiments, duration of rotation can depend on various other factors, including for example, a concentration of dispersants in the mixture and/or an initial particle size of the nickel flakes. Using smaller mixing media may reduce the size of the nickel flakes in a shorter duration, but may be more expensive, difficult to separate after size reduction, etc.

In some embodiments, a nickel component (e.g., nickel flakes) may undergo a process to reduce a size to larger than discussed above (e.g., greater than about 10 µm), or may not undergo a process to reduce a size of the flakes (e.g., providing a nickel film having increased roughness). In some embodiments, nickel ink and/or nickel film having increased roughness can be desirable. For example, use of nickel film having increased roughness may be advantageous in one or more applications to conduct current between electrically conductive terminals, such as in applications for energy storage devices (e.g., as part of current collectors of batteries, supercapacitors, and/or ultracapacitors, including for example electric double-layer capacitors (EDLC)). For example, nickel flakes for use in one or more applications in which conduction of current between terminals (e.g., two electronic components of an electronic device) may be desired can have nickel flakes which have a diameter and/or a longest dimension of about 10 µm to about 15 µm, including about 10 µm to about 12 µm. Without being limited by any particular theory or mode of operation, larger nickel flakes in a nickel ink mixture may facilitate improved current conduction due to increased continuous surface area between the layer comprising the nickel component and an adjacent layer where current conduction can occur, improved interlayer adhesion between the layer comprising the nickel component and the adjacent layer, and/or provide increased contact between conductive components of the nickel film (e.g., amongst the nickel component, such as nickel flakes, and/or carbon component, such as graphene, and/or between the nickel component and the carbon component) to facilitate current conduction.

In some embodiments, a mixture comprising a nickel component (e.g., nickel flakes), and a polycarboxylic acid component (e.g., glutaric acid) can be heated for duration of time. Heating the nickel flakes and the acid can contribute to increased electrical conductivity of a nickel film fabricated using the mixture. In some embodiments, heating of the nickel flakes in the presence of the acid component can facilitate removal of nickel oxide formed on one or more surfaces of the nickel flakes (e.g., due to native oxidation of the nickel flakes), making available increased conductive surface area on the nickel flakes. The heating process can be performed at various temperatures. For example, the heating process can be performed at a temperature of about 50° C. to about 150° C., preferably at a temperature of about 80° C. to about 120° C., more preferably at a temperature of about 90° C. to about 110° C., most preferably at a temperature of about 95° C. to about 105° C. For example, the heating process can be performed at a temperature of about 100° C. Removing oxide from the nickel flakes when the mixture comprising the nickel component and the polycarboxylic acid component is at too low a temperature may result in insufficient nickel oxide removal, for example providing a process with increased duration to achieve desired oxide removal. Increasing duration may result in undesired evaporation of one or more components of the mixture (e.g., a solvent component). Removing oxide from the nickel flakes when the mixture comprising the nickel component and the polycarboxylic acid component is at too high a temperature may result in undesired evaporation of one or more components of the mixture (e.g., a solvent component) and/or undesired polymerization between components of the mixture (e.g., between the polycarboxylic acid component and a polyol component).

The nickel flakes and the acid can be heated for a duration of time to achieve desired improvement in electrical conductivity of the film fabricated from the ink. In some embodiments, the heating process can be performed for a duration of about 15 minutes (min) to about 3 hours (hr), including about 45 min to about 75 min, and including about 50 min to about 70 min. For example, the nickel flakes and acid component can be heated for a duration of about 1 hr to about 2 hrs, including about 1 hr to about 1.5 hrs, for example about 1 hour, at a temperature of about 80° C. to about 120° C., for example about 100° C. The duration of heating can depend on a variety of parameters, including for example a temperature of the heating process, and/or a quantity of the mixture comprising the nickel flakes and the acid component being heated.

The heating process can be performed before and/or after a process for reducing a particle size of the nickel flakes. In some embodiments, heating of the nickel flakes and the acid component after a process for reducing a nickel flake particle size, in comparison to a similar nickel film fabricated without a heating process to remove nickel oxide, can increase the nickel film conductivity by at least about two times or about three times. For example, a nickel film printed using an ink (e.g., Nickel Ink 1 of Table 4) that did not undergo a heating process to facilitate etching of nickel oxide on one or more surfaces of the nickel flakes in the ink can have a sheet resistance of about 0.8 Ohms per square per mil (Ohms/sq/mil) to about 1.0 Ohms/sq/mil, such as about 0.9 Ohms/sq/mil. A nickel film printed using an ink having similar composition and that has undergone a heating process for removing nickel oxide can have a sheet resistance of about 0.4 Ohms/sq/mil to about 0.5 Ohms/sq/mil, such as about 0.45 Ohms/sq/mil.

In some embodiments, one or more components of a nickel ink for facilitating improved polar liquid phobicity can be added to the nickel ink mixture after a heating process (e.g., for removing nickel oxide from one or more surfaces of nickel flakes in the nickel ink mixture). In some embodiments, the one or more components for facilitating improved polar liquid phobicity can be added to the nickel ink mixture while maintaining the nickel ink mixture at a temperature of about 50° C. to about 100° C. In some embodiments, the one or more components for facilitating improved polar liquid phobicity can be added to the nickel ink mixture while stirring the nickel ink mixture. For example, dimer diamine can be added to the nickel ink mixture while maintaining the nickel ink mixture at a temperature of about 50° C. to about 100° C. and stirring the nickel ink mixture for about 20 minutes (min) to about 40 min, such as for about 30 min.

In some embodiments, an organic solvent (e.g., cyclohexanol) can be added to the nickel ink mixture. In some embodiments, the organic solvent can be added after addition of other components of the ink mixture. For example, the organic solvent can be added to the ink mixture after addition of dimer diamine for Nickel Ink 3 of Table 4. In some embodiments, the organic solvent can be added prior to a process for reducing a nickel flake particle size (e.g., before mixing the nickel ink mixture in a jar mill with mixing media). For example, the organic solvent can be added after the addition of nickel flakes and graphene flakes for Nickel Ink 2 of Table 4. In some embodiments, the solvent can be added at various points in the nickel ink fabrication process to change a viscosity of a mixture comprising one or more components of the nickel ink and/or improve printability of the nickel ink.

A nickel ink can be printed onto a substrate (e.g., a polyester substrate, Mylar®) using one or more processes described herein. One or more of Nickel Inks 1, 2, and 3 of Table 4 can be printed using screen printing process, such as through a polyester mesh screen having a mesh size of 110. The printed ink can be cured in a force air oven for a duration of about 10 minutes (min) to about 15 min, at a temperature of about 130° C. to about 150° C., including about 135° C. to about 145° C. (e.g., including about 280° F. to about 290° F.).

Examples of sheet resistance (e.g., expressed in ohms per square per mil, Ohms/sq/mil), adhesion, polar liquid phobicity, thickness (e.g., expressed in microns, μm), and range of roughness (e.g., expressed in microns, μm, based on nickel films fabricated using a jar mill mixing process with mixing beads having a diameter of about 5 millimeters (mm) to about 10 mm) performances of nickel films printed using Nickel Inks 1, 2 and 3 of Table 4 are listed in Table 6.

TABLE 6

Printed Film Properties

| | Sheet Resistance, Ohms/sq/mil | Adhesion, (0-5 Range) | Polar Liquid Phobicity | Thickness, μm | Range of Roughness, (5-10 mm beads) μm |
|---|---|---|---|---|---|
| Nickel Ink 1 | 0.45 ± 0.1 | 1 | No | 28-32 | 5-10 |
| Nickel Ink 2 | 0.9 ± 0.1 | 0 | Yes | 28-32 | 5-10 |
| Nickel Ink 3 | 0.7 ± 0.1 | 0 | Yes | 28-32 | 7-12 |

One or more methods of measuring performance of nickel films as described herein, for example with reference to Table 3, can be used for measuring one or more of the parameters listed in Table 6. For example, adhesiveness of a film to a substrate can be measured on a scale from 0 to 5, with 0 being very adhesive and 5 being least adhesive, using an ISO 2409 Cross-cut test. The adhesion performances of Table 6 are measured for nickel films printed on a polyester substrate surface (e.g., Mylar). As described herein, sheet resistance of a printed nickel film may be measured using the van der Pauw technique. Polar liquid phobicity of the printed nickel films can be measured using one or more methods known to one skilled in the art. For example, polar liquid phobicity may be assessed by the Sessile Drop Technique (e.g., measuring a contact angle of a droplet of liquid with a surface of the nickel film, where the droplet of liquid has a known surface energy, and a contact angle of greater than about 90° may indicate polar liquid phobicity). For another example, polar liquid phobicity may be assessed by soaking the nickel film in a polar liquid for a duration (e.g., about 1 month) and then testing properties such as film hardness or softness and electrical properties for changes that might impair function. Nickel film roughness may be measured using various suitable methods, including for example, by using a contact profilometer (e.g., a profilometer which contacts a nickel film surface with a stylus to measure a roughness of the nickel film surface) and/or non-contact profilometer (e.g., an optical profilometer).

One or more processes of preparing a nickel ink, including for example one or more processes as described with reference to Nickel Inks 1, 2, and 3 of Table 4, can be used for preparing the nickel ink compositions corresponding to the performance parameters of the Nickel Inks 1, 2, and 3 listed in Table 6. For example, the listed average roughness for Nickel Inks 1, 2, and 3 in Table 6 can be obtained using a mixing process in which nickel flakes are broken into smaller pieces using zirconia beads as mixing media, where the beads can have a diameter of about 5 millimeters (mm) to about 10 mm. For another example, the sheet resistance listed in Table 6 can be obtained using nickel inks which were heated during the ink fabrication process for removing at least a portion of nickel oxide from one or more surfaces of nickel flakes in the ink.

Referring to Table 6, nickel films printed using Nickel Inks 1, 2, and 3 of Table 4 can be printed to a similar thickness, which can help with comparison of properties. The nickel film printed using Nickel Ink 1, which includes the additives styrene and benzoyl peroxide, can have reduced sheet resistance, for example as compared to the nickel films printed using Nickel Inks 2 and 3. However, Nickel Ink 1 does not or substantially does not demonstrate polar liquid phobicity. The nickel film printed using Nickel Ink 1 also demonstrates reduced adhesion performance as compared to the nickel films printed using the other two nickel ink compositions, and has a reduced roughness as compared to the nickel film printed using Nickel Ink 3. The nickel film printed using Nickel Ink 2, which includes the additives styrene, benzoyl peroxide, dimer diamine, as well as cyclohexanol as a solvent, can demonstrate polar liquid phobicity, improved adhesion performance (e.g., as compared to the nickel film printed using Nickel Ink 1), and reduced roughness (e.g., as compared to the nickel film printed using Nickel Ink 3). However, the film printed using Nickel Ink 2 demonstrates increased sheet resistance. The nickel film printed using Nickel Ink 3 does not include the additives styrene and benzoyl peroxide, but includes dimer diamine, and cyclohexanol as a solvent. The nickel film printed using Nickel Ink 3 can demonstrate polar liquid phobicity (e.g., demonstrate minimal, or no or substantially no absorption of polar liquids), improved adhesion performance (e.g., as compared to the nickel film printed using Nickel Ink 1), and increased roughness (e.g., as compared to the nickel film printed using Nickel Ink 3). The sheet resistance performance of the nickel film printed using Nickel Ink 3 is between that of the films printed using Nickel Inks 1 and 3.

In some embodiments, composition of a nickel ink for a printed film can be selected based on one or more desired characteristics of the printed nickel film. For example, a nickel film can be printed using a nickel ink composition optimized for sheet resistance performance (e.g., Nickel Ink 1 of Table 4). Reduced sheet resistance may be desirable in a number of applications, including applications in which the nickel film provides electrical conduction between two or more terminals. In some embodiments, a nickel film can have a composition providing polar liquid phobicity and improved adhesiveness to an underlying substrate (e.g., Nickel Ink 3 of Table 4). As described herein, polar liquid phobicity can be advantageous in various applications, including for example in energy storage devices (e.g., batteries, capacitors, and/or ultracapacitors). In some embodiments, a nickel ink can be selected to provide a nickel film having reduced roughness while also having polar liquid phobicity and/or increased adhesion to a substrate (e.g., Nickel Ink 2 of Table 4). As described herein, reduced roughness may be advantageous in a number of applications, including for example for conductive films used in circuit boards.

Example Ink Compositions with Slight Variations of the Components of the Example Ink Composition Presented in Table 1

Listed in the tables below are various other examples of nickel ink compositions suitable for use in printing nickel films. The tables are labeled with descriptions indicating a change made to a component of the corresponding nickel ink composition (e.g., a component particle size, a concentration of a component, a type of material used for a component, and/or the addition of an additive component), as compared to the nickel ink composition listed in Table 1. Examples of measured sheet resistance (e.g., expressed in Ohm/sq/mil), adhesion, and range of roughness (e.g., expressed in μm) are also provided in a corresponding nickel film properties table for each of the nickel films printed using the nickel ink compositions having the listed change.

| Change of Ni flakes to filamentary Ni powder | | | | | |
|---|---|---|---|---|---|
| | Ink Component | | | | |
| | Nickel | Carbon | Poly-carboxylic Acid | Polyol | Other additives |
| Variety | Filamentary Nickel powder, 2-10 micron | Graphene flakes, 5 microns in diameter | Glutaric acid | Ethylene glycol | N/A |
| Weight Percent, wt % | 45.2 | 0.9 | 8.2 | 45.6 | |

| Printed film properties for change of Ni flakes to filamentary Ni powder | | |
|---|---|---|
| Sheet Resistance, Ohm/sq/mil | Adhesion (0-5) | Range of Roughness, μm |
| 1.0 | 3 | 10-25 (holes in the prints) |

| Change of graphene flake diameter from 5 μm to 25 μm | | | | | |
|---|---|---|---|---|---|
| | Ink Component | | | | |
| | Nickel | Carbon | Poly-carboxylic Acid | Polyol | Other additives |
| Variety | Flakes, 1 micron thick, 5-20 microns in diameter | Graphene flakes, 25 microns in diameter | Glutaric acid | Ethylene glycol | N/A |
| Weight Percent, wt % | 52.8 | 1.1 | 9.6 | 36.6 | |

| Printed film properties for change of graphene flake diameter from 5 μm to 25 μm | | |
|---|---|---|
| Sheet Resistance, Ohm/sq/mil | Adhesion (0-5) | Range of Roughness, μm |
| 1.1 | 1 | 7-12 |

| Change of graphene flakes to graphite powder | | | | | |
|---|---|---|---|---|---|
| | Ink Component | | | | |
| | Nickel | Carbon | Poly-carboxylic Acid | Polyol | Other additives |
| Variety | Flakes, 1 micron thick, 5-20 microns in diameter | Graphite powder | Glutaric acid | Ethylene glycol | N/A |
| Weight Percent, wt % | 52.8 | 1.1 | 9.6 | 36.6 | |

| Printed film properties for change of graphene flakes to graphite powder | | |
|---|---|---|
| Sheet Resistance, Ohm/sq/mil | Adhesion (0-5) | Range of Roughness, μm |
| 1.9 | 3 | 5-10 |

| Change in concentration of carbon additive from 1.4 wt % to 0 wt % | | | | | |
|---|---|---|---|---|---|
| | Ink Component | | | | |
| | Nickel | Carbon | Poly-carboxylic Acid | Polyol | Other additives |
| Variety | Flakes, 1 micron thick, 5-20 microns in diameter | N/A | Glutaric acid | Ethylene glycol | N/A |
| Weight Percent, wt % | 57.1 | 0 | 10.1 | 32.8 | |

Printed film properties for change in concentration of carbon additive from 1.4 wt % to 0 wt %

| Sheet Resistance, Ohm/sq/mil | Adhesion (0-5) | Range of Roughness, μm |
|---|---|---|
| 0.9 | 2 | 10-25, holes in the print |

Change in concentration of carbon additive from 1.4 wt % to 0.6 wt %

| | Ink Component | | | | |
|---|---|---|---|---|---|
| | Nickel | Carbon | Poly-carboxylic Acid | Polyol | Other additives |
| Variety | Flakes, 1 micron thick, 5-20 microns in diameter | Graphene flakes, 5 microns in diameter | Glutaric acid | Ethylene glycol | N/A |
| Weight Percent, wt % | 56.2 | 0.6 | 10.1 | 33.1 | |

Printed film properties for change in concentration of carbon additive from 1.4 wt % to 0.6 wt %

| Sheet Resistance, Ohm/sq/mil | Adhesion (0-5) | Range of Roughness, μm |
|---|---|---|
| 0.9 | 1 | 10-25 (holes in the print) |

Change in concentration of carbon additive from 1.4 wt % to 5.8 wt %

| | Ink Component | | | | |
|---|---|---|---|---|---|
| | Nickel | Carbon | Poly-carboxylic Acid | Polyol | Other additives |
| Variety | Flakes, 1 micron thick, 5-20 microns in diameter | Graphene flakes, 5 microns in diameter | Glutaric acid | Ethylene glycol | N/A |
| Weight Percent, wt % | 51.3 | 5.8 | 10.1 | 32.8 | |

Printed film properties for change in concentration of carbon additive from 1.4 wt % to 5.8 wt %

| Sheet Resistance, Ohm/sq/mil | Adhesion (0-5) | Range of Roughness, μm |
|---|---|---|
| 5.5 | 1 | 5-8 |

Change of acid from glutaric acid to malonic acid

| | Ink Component | | | | |
|---|---|---|---|---|---|
| | Nickel | Carbon | Poly-carboxylic Acid | Polyol | Other additives |
| Variety | Flakes, 1 micron thick, 5-20 microns in diameter | Graphene flakes, 5 microns in diameter | Malonic acid | Ethylene glycol | N/A |
| Weight Percent, wt % | 57.2 | 1.2 | 8.2 | 33.4 | |

Printed film properties for change of acid from glutaric acid to malonic acid

| Sheet Resistance, Ohm/sq/mil | Adhesion (0-5) | Range of Roughness, μm |
|---|---|---|
| 1.0 | 1 | 7-12 |

Change of alcohol from ethylene glycol to 1,3 propylene glycol

| | Ink Component | | | | |
|---|---|---|---|---|---|
| | Nickel | Carbon | Poly-carboxylic Acid | Polyol | Other additives |
| Variety | Flakes, 1 micron thick, 5-20 microns in diameter | Graphene flakes, 5 microns in diameter | Glutaric acid | 1,3 propylene glycol | N/A |
| Weight Percent, wt % | 56.0 | 1.2 | 10.1 | 32.7 | |

Printed film properties for change of alcohol from ethylene glycol to 1,3 propylene glycol

| Sheet Resistance, Ohm/sq/mil | Adhesion (0-5) | Range of Roughness, μm |
|---|---|---|
| 1.4 | 1 | 5-10 |

Addition of polyethylene glycol 600 as additive

| | Ink Component | | | | |
|---|---|---|---|---|---|
| | Nickel | Carbon | Poly-carboxylic Acid | Polyol | Other additives |
| Variety | Flakes, 1 micron thick, 5-20 microns in diameter | Graphene flakes, 5 microns in diameter | Glutaric acid | Ethylene glycol | Polyethylene glycol (600) as wetting agent |
| Weight Percent, wt % | 56.0 | 1.2 | 10.1 | 26.4 | 6.3 |

Printed film properties for addition of
polyethylene glycol 600 as additive

| Sheet Resistance, Ohm/sq/mil | Adhesion (0-5) | Range of Roughness, μm |
|---|---|---|
| 600 | 1 | 5-10 |

Addition of N,N-Diethylhydroxlyamine as additive

| | Ink Component | | | |
|---|---|---|---|---|
| | Nickel | Carbon | Poly-carboxylic Acid | Polyol | Other additives |
| Variety | Flakes, 1 micron thick, 5-20 microns in diameter | Graphene flakes, 5 microns in diameter | Glutaric acid | Ethylene glycol | N,N-diethylhydroxylamine as antioxidant |
| Weight Percent, wt % | 54.9 | 1.4 | 10.0 | 32.4 | 1.4 |

Printed film properties for addition of
N,N-Diethylhydroxlyamine as additive

| Sheet Resistance, Ohm/sq/mil | Adhesion (0-5) | Range of Roughness, μm |
|---|---|---|
| 1.5 | 1 | 5-10 |

Adhesion performance, sheet resistance, printability performance, and/or other performance parameters for nickel films printed using nickel ink compositions listed in the tables above can be measured by using one or more measurement techniques described herein. For example, the adhesion for listed compositions including nickel flakes and graphene flakes, as measured using the ISO test described above, was 1. Adhesion of the compositions including filamentary nickel powder and graphite powder were each 3. The resistance for some of the listed modified compositions were comparable to the resistance of nickel film printed using the nickel ink composition of Table 1, but other printability parameters (e.g., thickness and smoothness) were not as desirable as that of the film printed using the composition listed in Table 1.

Example Variations in Ink Composition from the Example Composition Presented in Table 1 and/or the Printing Parameters from the Example Printing Parameters Presented in Table 2

Listed in the tables below are examples of nickel ink viscosity, nickel ink compositions, and nickel ink printing parameters. The description heading each table indicates the change made to the concentration of the polyol component, as compared to the nickel ink composition of Table 1. Examples of measured sheet resistance (e.g., expressed in Ohm/sq/mil), adhesion, and range of roughness (e.g., expressed in μm) are also provided in a corresponding nickel film properties table for each of the nickel films printed using the nickel ink compositions having the listed change.

Change in viscosity by adding more ethylene
glycol to the composition of Table 1

| Viscosity at 25° C., cP | Mesh type | Mesh size | Curing temperature, ° C. | Curing time, min |
|---|---|---|---|---|
| 6,000 | Polyester | 110 | 138 | 10 |

| | Ink component | | | |
|---|---|---|---|---|
| | Nickel | Carbon | Polycarboxylic Acid | Polyol |
| Variety | Flakes, 1 micron thick, 5-20 microns in diameter | Graphene flakes, 5 microns in diameter | Glutaric acid | Ethylene glycol |
| Weight Percent, wt % | 54.2 | 1.1 | 9.9 | 34.8 |

Printed film properties for change in viscosity by adding
more ethylene glycol to the composition of Table 1

| Sheet Resistance, Ohm/sq/mil | Adhesion (0-5) | Range of Roughness, μm |
|---|---|---|
| 1.0 | 1 | 7-12 |

Change in viscosity by adding less ethylene
glycol to the composition of Table 1

| Viscosity at 25° C., cP | Mesh type | Mesh size | Curing temperature, ° C. | Curing time, min |
|---|---|---|---|---|
| 11,000 | Polyester | 110 | 138 | 10 |

| | Ink component | | | |
|---|---|---|---|---|
| | Nickel | Carbon | Polycarboxylic Acid | Polyol |
| Variety | Flakes, 1 micron thick, 5-20 microns in diameter | Graphene flakes, 5 microns in diameter | Glutaric acid | Ethylene glycol |
| Weight Percent, wt % | 57.6 | 1.2 | 10.4 | 30.8 |

Printed film properties for change in viscosity adding
by less ethylene glycol to the composition of Table 1

| Sheet Resistance, Ohm/sq/mil | Adhesion (0-5) | Range of Roughness, μm |
|---|---|---|
| 1.4 | 1 | 7-12 |

Listed in the tables below are examples of parameters of suitable printing processes that can be used to print one or more nickel ink compositions described herein. The description heading each table provides a printing parameter that is different from the printing process of Table 2. Examples of measured sheet resistance (e.g., expressed in Ohm/sq/mil), adhesion, and range of roughness (e.g., expressed in μm) are also provided in a corresponding nickel film properties table for each of the nickel films printed using the nickel ink compositions having the listed change.

| Change of substrate from Mylar to polyamide | | | | |
|---|---|---|---|---|
| Viscosity at 25° C., cP | Mesh type | Mesh size | Curing temperature, ° C. | Curing time, min |
| 9,000 | Polyester | 110 | 138 | 10 |

| Printed film properties for change of substrate from Mylar to polyamide | | |
|---|---|---|
| Sheet Resistance, Ohm/sq/mil | Adhesion (0-5) | Range of Roughness, μm |
| 0.8 | 1 | 5-7 |

| Change of mesh type from polyester to a polyamide (e.g., nylon) | | | | |
|---|---|---|---|---|
| Viscosity at 25° C., cP | Mesh type | Mesh size | Curing temperature, ° C. | Curing time, min |
| 9,000 | Nylon | 110 | 138 | 10 |

| Printed film properties for change of mesh type from polyester to a polyamide (e.g., nylon) | | |
|---|---|---|
| Sheet Resistance, Ohm/sq/mil | Adhesion (0-5) | Range of Roughness, μm |
| 0.8 | 1 | 7-12 |

| Change of mesh size from 110 to 135 | | | | |
|---|---|---|---|---|
| Viscosity at 25° C., cP | Mesh type | Mesh size | Curing temperature, ° C. | Curing time, min |
|  | Polyester | 135 | 138 | 10 |

| Printed film properties for change of mesh size from 110 to 135 | | |
|---|---|---|
| Sheet Resistance, Ohm/sq/mil | Adhesion (0-5) | Range of Roughness, μm |
| 0.8 | 1 | 7-12 |

| Change of curing temperature from 138° C. to 143° C. | | | | |
|---|---|---|---|---|
| Viscosity at 25° C., cP | Mesh type | Mesh size | Curing temperature, ° C. | Curing time, min |
|  | Polyester | 110 | 143 | 10 |

| Printed film properties for change of curing temperature from 138° C. to 143° C. | | |
|---|---|---|
| Sheet Resistance, Ohm/sq/mil | Adhesion (0-5) | Range of Roughness, μm |
| 0.8 | 1 | 7-12 |

| Change of curing time from 10 min to 5 min | | | | |
|---|---|---|---|---|
| Viscosity at 25° C., cP | Mesh type | Mesh size | Curing temperature, ° C. | Curing time, min |
|  | Polyester | 110 | 138 | 5 |

| Printed film properties for change of curing time from 10 min to 5 min | | |
|---|---|---|
| Sheet Resistance, Ohm/sq/mil | Adhesion (0-5) | Range of Roughness, μm |
| 1.0 | 1 | 7-12 |

Alternative Techniques

Ink Preparation Techniques

All kinds of mixing and dispersing techniques may be used, including, for example, mixing with a jar mill, mixing with a stir rod, mixing with magnetic stirrer, mixing under heating, vortexing (e.g., using a Vortex machine), shaking (using shakers), mixing by rotation, sonication, mortar and pestle, three-roll mill, combinations thereof, and the like.

Printing Techniques

"Printing" includes any and all printing processes, coating, rolling, spraying, layering, spin coating, lamination, and/or affixing processes, including, for example, screen printing, inkjet printing, electro-optical printing, electroink printing, photoresist and other resist printing, thermal printing, laser jet printing, magnetic printing, pad printing, flexographic printing, hybrid offset lithography, Gravure and other intaglio printing, die slot deposition, combinations thereof, and the like. Screen printing with different mesh sizes and screen types are also possible.

Curing Conditions

A wide variety of temperature and curing time durations may be used depending on solvents used. The temperature is generally from about 100° C. to about 200° C. Drying duration can vary from about 20 seconds to about 1 hour.

The atmosphere can be ambient, inert, vacuum, combinations thereof, and the like.

Alternative Components

Substrates

In some embodiments, substrates can be conductive and/or non-conductive. For example, a substrate can comprise graphite paper, graphene paper, polyester film (e.g., Mylar®), polyimide film, aluminum (Al) foil, copper (Cu) foil, stainless steel foil, carbon foam, polycarbonate film, paper, coated paper, plastic coated paper, fiber paper, cardboard, combinations thereof, and the like.

Nickel Powders

In some embodiments, the nickel comprises particles of any shape. For example, the nickel can comprise flakes, nano/microwires, spheres, a random particles shape, combinations thereof, and the like. Nickel flakes may be available commercially (e.g., from Novamet Specialty Products Corp., of Wyckoff, N.J.). Nickel particles may have a thickness of less than about 5 microns. In some embodiments, nickel particles can have a thickness of about 1 micron. Nickel particles may be of all printable sizes (e.g., a length and/or a diameter from about 100 nanometers (nm) to about 50 microns, from about 500 nanometers to about 30 microns, from about 1 micron to about 20 microns, and from about 5 microns to about 20 microns). An increased nickel particle dimension (e.g., a length and/or a diameter) may increase inter-flake contact, facilitating improved conductivity of the nickel film. In some embodiments, a nickel ink can include nickel particles having a size which allows increased inter-particle contact for improved nickel ink conductivity. In some embodiments, nickel particles of a nickel ink can have a size enabling increased inter-particle contact, while facilitating printing of the nickel ink and/or dispersion of the nickel flakes in the nickel ink.

Carbon Additive

In some embodiments, carbon particles can be of any shape. For example, carbon can comprise flakes, nano/microwires, spheres, a random particles shape, combinations thereof, and the like. Carbon particles can be of all printable sizes (e.g., a length and/or a diameter from about 100 nm to about 50 microns). For example, carbon particles may have a diameter of about 5 microns.

The carbon additive may be of any origin, including, for example, graphene, graphite, activated carbon, carbon nanotubes, carbon nanofibers, combinations thereof, and the like. In some embodiments, graphene flakes are commercially available (e.g., from XG Sciences, Inc., of Lansing, Mich.). In some embodiments, graphite is commercially available (e.g., from IMCAL Ltd., of Westlake, Ohio). Other carbon additives may also be commercially available (e.g., carbon nanotubes from SouthWest Nanotechnologies Inc., of Norman, Okla., and carbon nanofibers from Pyrograf Products, Inc., of Cedarville, Ohio).

Components of the Polymer (Polyester)

Polymers or polyesters may be molten or dissolved polyesters (e.g., polymers which contain the ester functional group in their main chain). A polyester may be made from a combination of acids and alcohols (e.g., via polycondensation). Example acids can include: dicarboxylic acids such as propanedioic (malonic) acid, butanedioic (succinic) acid, pentanedioic (glutaric) acid, hexanedioic (adipic) acid, heptanedioic (pimelic) acid, octanedioic (suberic) acid, nonanedioic (azelaic) acid, decanedioic (sebacic) acid, undecanedioic acid, dodecanedioic acid, tridecanedioic (brassylic) acid, tetradecanedioic acid, pentadecanedioic acid, hexadecanedioic (thapsic) acid, octadecanedioic acid, maleic acid, fumaric acid, glutaconic acid, traumatic acid and/or muconic acid; tricarboxylic acids, such as citric acid, isocitric acid, aconitic acid, carballylic acid, trimesic acid, terephthalic acid; the like, and mixtures thereof.

Example alcohols can include: polyols (or liquid polyols), glycerols and glycols such as glycerin, diol, triol, tetraol, pentaol, ethylene glycols, diethylene glycols, polyethylene glycols, propylene glycols, dipropylene glycols, glycol ethers, glycol ether acetates 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol, combinations thereof, and the like.

A polyester may be made from hydroxicarboxilic acids (e.g., via polycondensation): 4-hydroxybenzoic acid, glycolic acid, lactic acid, citric acid, mandelic acid, beta hydroxy acid, omega hydroxy acid, salicylic acid, 3-hydroxypropionic acid, 6-hydroxynaphthalene-2-carboxylic acid, combinations thereof, and the like.

Additives

Additives to inks can have several functions. For example, additives may be a viscosity modifier, wetting agents, flow and leveling agents, and adhesion promoters, and/or corrosion inhibitors. In some embodiments, solvents can act as viscosity modifiers and wetting agents, flow and leveling agents, and adhesion promoters.

Example solvents include: water, alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; butyl lactone; ethers such as methyl ethyl ether, diethyl ether, ethyl propyl ether, dibasic esters and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, dimethyl adipate, proplyene glycol monomethyl ether acetate, dimethyl glutarate, dimethyl succinate, glycerin acetate, carboxylates; carbonates such as propylene carbonate; glycol ethers, glycol ether acetates, tetramethyl urea, n-methylpyrrolidone, acetonitrile, tetrahydrofuran (THF), dimethyl formamide (DMF), N-methyl formamide (NMF), dimethyl sulfoxide (DMSO); thionyl chloride; sulfuryl chloride, 1,2-diaminoethane, propane-1,3-diamine, butane-1,4-diamine, (pentane-1,5-diamine, hexane-1,6-diamine, 1,2-diaminopropane, diphenylethylenediamine, diaminocyclohexane, o-xylylenediamine, o-phenylenediamine, m-phenylenediamine, hexane, decane, teradecane, styrene, 1-vinyl-2-pyrolidone, toluene, pyridine, triethyl phosphate, combinations thereof, and the like.

In some embodiments, corrosion inhibitors can include N,N-Diethylhydroxylamine, ascorbic acid, hydrazine, hexamine, phenylenediamine, benzotriazole, zinc dithiophosphate, tannic acid, zinc phosphate, hexafluoroacetylacetone, combinations thereof, and the like.

In some embodiments, a nickel ink can include one or more other additives to facilitate a polymerization reaction (e.g., a co-polymerization reaction of an unsaturated polyester), such as benzoyl peroxide, 2-butanol peroxide, 2,4-chlorobenzoyl peroxide, lauryl peroxide, other peroxides, combinations thereof, and/or the like.

EXAMPLE EMBODIMENTS

The following example embodiments identify some possible permutations of combinations of features disclosed herein, although other permutations of combinations of features are also possible.

1. A conductive ink comprising:
    a nickel component;
    a polycarboxylic acid component; and
    a polyol component, the polycarboxylic acid component and the polyol component being reactable to form a polyester component.
2. The conductive ink of embodiment 1, further comprising an additive component.
3. The conductive ink of embodiment 1 or 2, further comprising a carbon component.

4. The conductive ink of any one of embodiments 1 to 3, wherein the nickel component comprises at least one of nickel flakes, nickel nano/microwires, and nickel spheres.

5. The conductive ink of embodiment 4, wherein the nickel flakes comprise a thickness of less than about 5 microns.

6. The conductive ink of embodiment 4 or 5, wherein the nickel flakes comprise a diameter of about 500 nanometers to about 30 microns.

7. The conductive ink of any one of embodiments 1 to 6, wherein the nickel component comprises a filamentary nickel powder.

8. The conductive ink of embodiment 7, wherein the filamentary nickel powder comprises a longest dimension in a range of about 2 microns to about 10 microns.

9. The conductive ink of any one of embodiments 1 to 8, wherein the nickel component comprises at least one particle having a longest dimension in a range of about 100 nanometers to about 50 microns.

10. The conductive ink of any one of embodiments 1 to 8, wherein the nickel component comprises at least one particle having a longest dimension in a range of about 5 microns to about 20 microns.

11. The conductive ink of any one of embodiments 3 to 10, wherein the carbon component comprises at least one of carbon flakes, carbon nano/microwires, and carbon spheres.

12. The conductive ink of any one of embodiments 3 to 11, wherein the carbon component comprises at least one of graphene, graphite, activated carbon, carbon nanotubes, and carbon nanofibers.

13. The conductive ink of embodiment 12, wherein the graphene comprises graphene flakes.

14. The conductive ink of embodiment 13, wherein at least one of the graphene flakes comprises a diameter of about 5 microns.

15. The conductive ink of embodiment 13 or 14, wherein at least one of the graphene flakes comprises a diameter of about 100 nanometers to about 50 microns.

16. The conductive ink of any one of embodiments 12 to 15, wherein the graphite comprises a graphite powder.

17. The conductive ink of any one of embodiments 1 to 16, wherein the polycarboxylic acid component comprises a dicarboxylic acid.

18. The conductive ink of embodiment 17, wherein the dicarboxylic acid comprises at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, an octadecanedioic acid, a maleic acid, a fumaric acid, a glutaconic acid, a traumatic acid and a muconic acid.

19. The conductive ink of any one of embodiments 1 to 18, wherein the polycarboxylic acid component comprises a tricarboxylic acid.

20. The conductive ink of embodiment 19, wherein the tricarboxylic comprises at least one of a citric acid, an isocitric acid, an aconitic acid, a carballylic acid, a trimesic acid, and a terephthalic acid.

21. The conductive ink of any one of embodiments 1 to 20, wherein the polycarboxylic acid component comprises a hydroxicarboxilic acid.

22. The conductive ink of embodiment 21, wherein the hydroxicarboxilic acid comprises at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

23. The conductive ink of embodiment 22, wherein the polyol component comprises at least one of a glycerol and a glycol.

24. The conductive ink of embodiment 22 or 23, wherein the polyol component comprises at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

25. The conductive ink of any one of embodiments 2 to 24, wherein the additive component comprises at least one of a viscosity modifier, a wetting agent, a flow and leveling agent, an adhesion promoter, and a corrosion inhibitor.

26. The conductive ink of embodiment 25, wherein the wetting agent comprises a polyethylene glycol.

27. The conductive ink of embodiment 25 or 26, wherein the corrosion inhibitor comprises at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

28. The conductive ink of any one of embodiments 2 to 27, wherein the additive component comprises a solvent.

29. The conductive ink of embodiment 28, wherein the solvent comprises at least one of a viscosity modifier, a wetting agent, a flow and leveling agent, and an adhesion promoter.

30. The conductive ink of embodiment 28 or 29, wherein the solvent comprises at least one of an alcohol and water.

31. The conductive ink of embodiment 30, wherein the alcohol comprises at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol.

32. The conductive ink of embodiment 31, wherein the N-propanol comprises at least one of a 1-propanol, a 2-propanol, and a 1-methoxy-2-propanol.

33. The conductive ink of embodiment 31, wherein the butanol comprises at least one of a 1-butanol and a 2-butanol.

34. The conductive ink of embodiment 31, wherein the pentanol comprises at least one of a 1-pentanol, a 2-pentanol, and a 3-pentanol.

35. The conductive ink of embodiment 31, wherein the hexanol comprises at least one of a 1-hexanol, a 2-hexanol, and a 3-hexanol.

36. The conductive ink of embodiment 31, wherein the N-octanol comprises at least one of a 1-octanol, a 2-octanol, and a 3-octanol.

37. The conductive ink of any one of embodiments 2 to 36, wherein the additive component comprises a butyl lactone.

38. The conductive ink of any one of embodiments 2 to 37, wherein the additive component comprises an ether.

39. The conductive ink of embodiment 38, wherein the ether comprises at least one of a methyl ethyl ether, a diethyl ether, an ethyl propyl ether, and a polyether.
40. The conductive ink of any one of embodiments 2 to 39, wherein the additive component comprises a ketone.
41. The conductive ink of embodiment 40, wherein the ketone comprises at least one of an acetone and a methyl ethyl ketone.
42. The conductive ink of embodiment 40 or 41, wherein the ketone comprises at least one of a diketone and a cyclic ketone.
43. The conductive ink of embodiment 42, wherein the cyclic ketone comprises at least one of a cyclohexanone, a cyclopentanone, a cycloheptanone, a cyclooctanone, a benzophenone, an acetylacetone, an acetophenone, a cyclopropanone, and an isophorone.
44. The conductive ink of any one of embodiments 2 to 43, wherein the additive component comprises an ester.
45. The conductive ink of embodiment 44, wherein the ester comprises at least one of a dibasic ester, an ethyl acetate, a dimethyl adipate, a proplyene glycol monomethyl ether acetate, a dimethyl glutarate, a dimethyl succinate, a glycerin acetate, and a carboxylate.
46. The conductive ink of any one of embodiments 2 to 45, wherein the additive component comprises a carbonate.
47. The conductive ink of embodiment 46, wherein the carbonate comprises a propylene carbonate.
48. The conductive ink of any one of embodiments 2 to 47, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, a teradecane, a styrene, a 1-vinyl-2-pyrolidone, a toluene, a pyridine, and a triethyl phosphate.
49. The conductive ink of any one of embodiments 1 to 48, wherein the conductive ink has a viscosity at about 25° C. in a range from about 5,000 centipoise to about 11,000 centipoise.
50. The conductive ink of any one of embodiments 1 to 49, wherein the nickel component is in a range from about 50 wt % to about 60 wt %.
51. The conductive ink of any one of embodiments 1 to 49, wherein the nickel component is in a range from about 35 wt % to about 65 wt %.
52. The conductive ink of any one of embodiments 3 to 51, wherein the carbon component is in a range from about 0.5 wt % to about 2.5 wt %.
53. The conductive ink of any one of embodiments 3 to 51, wherein the carbon component is less than about 10 wt %.
54. The conductive ink of any of embodiments 1 to 53, wherein the polycarboxylic acid component is in a range from about 5 wt % to about 15 wt %.
55. The conductive ink of any one of embodiments 1 to 54, wherein the polyol component is in a range from about 25 wt % to about 40 wt %.
56. The conductive ink of any one of embodiments 1 to 54, wherein the polyol component is in a range from about 15 wt % to about 60 wt %.
57. The conductive ink of any of embodiments 2 to 56, wherein the additive component is less than about 10%.
58. A conductive film comprising:
   a nickel component; and
   a polyester component.
59. The conductive film of embodiment 58, further comprising an additive component.
60. The conductive film of embodiment 58 or 59, further comprising a carbon component.
61. The conductive film of any one of embodiments 58 to 60, wherein the nickel component comprises at least one of nickel flakes, nickel nano/microwires, and nickel spheres.
62. The conductive film of embodiment 61, wherein the nickel flakes comprise a thickness of less than about 5 microns.
63. The conductive film of embodiment 61 or 62, wherein the nickel flakes comprise a diameter of about 500 nanometers to about 30 microns.
64. The conductive film of any one of embodiments 58 to 63, wherein the nickel component comprises a filamentary nickel powder.
65. The conductive film of embodiment 64, wherein the filamentary nickel powder comprises a longest dimension in a range of about 2 microns to about 10 microns.
66. The conductive film of any one of embodiments 58 to 65, wherein the nickel component comprises at least one particle having a longest dimension in a range of about 100 nanometers to about 50 microns.
67. The conductive film of any one of embodiments 58 to 65, wherein the nickel component comprises at least one particle having a longest dimension in a range of about 5 microns to about 20 microns.
68. The conductive film of any one of embodiments 60 to 67, wherein the carbon component comprises at least one of carbon flakes, carbon nano/microwires, and carbon spheres.
69. The conductive film of any one of embodiments 60 to 68, wherein the carbon component comprises at least one of graphene, graphite, activated carbon, carbon nanotubes, and carbon nanofibers.
70. The conductive film of embodiment 69, wherein the graphene comprises graphene flakes.
71. The conductive film of embodiment 70, wherein at least one of the graphene flakes comprises a diameter of about 5 microns.
72. The conductive film of any one of embodiments 70 or 71, wherein at least one of the graphene flakes comprises a diameter of about 100 nanometers to about 50 microns.
73. The conductive film of any one of embodiments 69 to 72, wherein the graphite comprises a graphite powder.
74. The conductive film of any one of embodiments 58 to 73, wherein the polyester component is formed in situ from a polycarboxylic acid component and a polyol component.
75. The conductive film of any one of embodiments 58 to 74, wherein the conductive film has a sheet resistance in a range from about 0.5 ohm/sq/mil to about 1.5 ohm/sq/mil.
76. The conductive film of any one of embodiments 58 to 75, wherein the conductive film has a thickness in a range from about 4 microns to about 40 microns.
77. The conductive film of any one of embodiments 58 to 76, wherein the conductive film can be printed onto a substrate.

78. The conductive film of embodiment 77, wherein the substrate comprises a conductive substrate or a non-conductive substrate.
79. The conductive film of embodiment 77 or 78, wherein the substrate comprises at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.
80. A method of fabricating a conductive ink, the method comprising:
dispersing a nickel component in a solvent component; and
dispersing a polyester component in the solvent component.
81. The method of embodiment 80, further comprising dispersing a carbon component in the solvent component.
82. The method of embodiment 80 or 81, wherein dispersing the nickel component in the solvent component is before dispersing the polyester component in the solvent component.
83. The method of any one of embodiments 80 to 82, wherein dispersing the nickel component in the solvent component is after dispersing the polyester component in the solvent component.
84. The method of any one of embodiments 80 to 83, wherein dispersing the nickel component in the solvent component is before dispersing the carbon component in the solvent component.
85. The method of any one of embodiments 80 to 83, wherein dispersing the nickel component in the solvent component is after dispersing the carbon component in the solvent component.
86. The method of any one of embodiments 80 to 85, wherein dispersing the carbon component in the solvent component is before dispersing the polyester component in the solvent component.
87. The method of any one of embodiments 80 to 85, wherein dispersing the carbon component in the solvent component is after dispersing the polyester component in the solvent component.
88. The method of any one of embodiments 80 to 87, further comprising adding an additive component to the solvent component.
89. The method of embodiment 88, wherein adding the additive component to the solvent component is before dispersing the nickel component in the solvent.
90. The method of embodiment 88, wherein adding the additive component to the solvent component is after dispersing the nickel component in the solvent.
91. The method of any one of embodiments 88 to 90, wherein adding the additive component to the solvent component is before dispersing the polyester component in the solvent.
92. The method of any one of embodiments 88 to 90, wherein adding the additive component to the solvent component is after dispersing the polyester component in the solvent.
93. The method of any one of embodiments 88 to 92, wherein adding the additive component to the solvent component is before dispersing the carbon component in the solvent.
94. The method of any one of embodiments 88 to 92, wherein adding the additive component to the solvent component is after dispersing the carbon component in the solvent.
95. The method of any one of embodiments 80 to 94, wherein the conductive ink is printable onto a substrate.
96. The method of embodiment 95, wherein the substrate comprises a conductive substrate or a non-conductive substrate.
97. The method of embodiment 95 or 96, wherein the substrate comprises at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.
98. The method of any one of embodiments 80 to 97, wherein the nickel component comprises at least one of nickel flakes, nickel nano/microwires, and nickel spheres.
99. The method of embodiment 98, wherein the nickel flakes comprise a thickness of less than about 5 microns.
100. The method of embodiment 98 or 99, wherein the nickel flakes comprise a diameter of about 500 nanometers to about 30 microns.
101. The method of any one of embodiments 80 to 100, wherein the nickel component comprises a filamentary nickel powder.
102. The method of embodiment 101, wherein the filamentary nickel powder comprises a longest dimension in a range of about 2 microns to about 10 microns.
103. The method of any one of embodiments 80 to 102, wherein the nickel component comprises at least one particle having a longest dimension in a range of about 100 nanometers to about 50 microns.
104. The method of any one of embodiments 81 to 103, wherein the carbon component comprises at least one of carbon flakes, carbon nano/microwires, and carbon spheres.
105. The method of any one of embodiments 81 to 104, wherein the carbon component comprises at least one of graphene, graphite, activated carbon, carbon nanotubes, and carbon nanofibers.
106. The method of embodiment 105, wherein the graphene comprises graphene flakes.
107. The method of embodiment 106, wherein at least one of the graphene flakes comprises a diameter of about 5 microns.
108. The method of embodiment 105 or 106, wherein at least one of the graphene flakes comprises a diameter of about 100 nanometers to about 50 microns.
109. The method of any one of embodiments 105 to 108, wherein the graphite comprises a graphite powder.
110. The method of any one of embodiments 80 to 109, wherein the polyester component is formed from a polycarboxylic acid component and a polyol component.
111. The method of embodiment 110, wherein the polycarboxylic acid component comprises a dicarboxylic acid.
112. The method of embodiment 111, wherein the dicarboxylic acid comprises at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, an octadecanedioic acid, a maleic acid, a fumaric acid, a glutaconic acid, a traumatic acid and a muconic acid.

113. The method of any one of embodiments 110 to 112, wherein the polycarboxylic acid component comprises a tricarboxylic acid.

114. The method of embodiment 113, wherein the tricarboxylic comprises at least one of a citric acid, an isocitric acid, an aconitic acid, a carballylic acid, a trimesic acid, and a terephthalic acid.

115. The method of any one of embodiments 110 to 114, wherein the polycarboxylic acid component comprises a hydroxicarboxilic acid.

116. The method of embodiment 115, wherein the hydroxicarboxilic acid comprises at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

117. The method of any one of embodiments 110 to 116, wherein the polyol component comprises at least one of a glycerol and a glycol.

118. The method of embodiment 110 to 117, wherein the polyol component comprises at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

119. The method of any one of embodiments 88 to 118, wherein the additive component comprises at least one of a viscosity modifier, a wetting agent, a flow and leveling agent, an adhesion promoter, and a corrosion inhibitor.

120. The method of embodiment 119, wherein the wetting agent comprises a polyethylene glycol.

121. The method of embodiment 119 or 120, wherein the corrosion inhibitor comprises at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

122. The method of any one of embodiments 88 to 121, wherein the additive component comprises a solvent.

123. The method of embodiment 122, wherein the solvent comprises at least one of a viscosity modifier, a wetting agent, a flow and leveling agent and an adhesion promoter.

124. The method of any one of embodiment 122 or 123, wherein the solvent comprises at least one of an alcohol and water.

125. The method of embodiment 124, wherein the alcohol comprises at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol.

126. The method of embodiment 125, wherein the N-propanol comprises at least one of a 1-propanol, a 2-propanol, and a 1-methoxy-2-propanol.

127. The method of embodiment 125, wherein the butanol comprises at least one of a 1-butanol and a 2-butanol.

128. The method of embodiment 125, wherein the pentanol comprises at least one of a 1-pentanol, a 2-pentanol, and a 3-pentanol.

129. The method of embodiment 125, wherein the hexanol comprises at least one of a 1-hexanol, a 2-hexanol, and a 3-hexanol.

130. The method of embodiment 125, wherein the N-octanol comprises at least one of a 1-octanol, a 2-octanol, and a 3-octanol.

131. The method of any one of embodiments 88 to 130, wherein the additive component comprises a butyl lactone.

132. The method of any one of embodiments 88 to 131, wherein the additive component comprises an ether.

133. The method of embodiment 132, wherein the ether comprises at least one of a methyl ethyl ether, a diethyl ether, an ethyl propyl ether, and a polyether.

134. The method of any one of embodiments 88 to 133, wherein the additive component comprises a ketone.

135. The method of embodiment 134, wherein the ketone comprises at least one of an acetone and a methyl ethyl ketone.

136. The method of embodiments 134 or 135, wherein the ketone comprises at least one of a diketone and a cyclic ketone.

137. The method of embodiment 136, wherein the cyclic ketone comprises at least one of a cyclohexanone, a cyclopentanone, a cycloheptanone, a cyclooctanone, a benzophenone, an acetylacetone, an acetophenone, a cyclopropanone, and an isophorone.

138. The method of any one of embodiments 88 to 137, wherein the additive component comprises an ester.

139. The method of embodiment 138, wherein the ester comprises at least one of a dibasic ester, an ethyl acetate, a dimethyl adipate, a proplyene glycol monomethyl ether acetate, a dimethyl glutarate, a dimethyl succinate, a glycerin acetate, and a carboxylate.

140. The method of any one of embodiments 88 to 139, wherein the additive component comprises a carbonate.

141. The method of embodiment 140, wherein the carbonate comprises a propylene carbonate.

142. The method of any one of embodiments 88 to 141, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, a teradecane, a styrene, a 1-vinyl-2-pyrolidone, a toluene, a pyridine, and a triethyl phosphate.

143. The method of any one of embodiments 80 to 142, wherein the conductive ink has a viscosity at about 25° C. in a range from about 5,000 centipoise to about 11,000 centipoise.

144. The method of any one of embodiments 80 to 143, wherein the nickel component is in a range from about 50 wt % to about 60 wt %.

145. The method of any one of embodiments 80 to 143, wherein the nickel component is in a range from about 35 wt % to about 65 wt %.

146. The method of any one of embodiments 81 to 145, wherein the carbon component is in a range from about 0.5 wt % to about 2.5 wt %.

147. The method of any one of embodiments 81 to 145, wherein the carbon component is less than about 10 wt %.

148. The method of any of embodiments 88 to 147, wherein the additive component is less than about 10 wt %.

149. A method of fabricating a conductive film, the method comprising:
printing a conductive ink on a substrate, the conductive ink comprising:
a nickel component, and
a polyester component; and
curing the printed conductive ink.

150. The method of embodiment 149, wherein printing comprises at least one of a screen printing process, a coating process, a rolling process, a spraying process, a layering process, a spin coating process, a lamination process, an affixing process, an inkjet printing process, an electro-optical printing process, an electroink printing process, a resist printing process, a thermal printing process, a laser jet printing process, a magnetic printing process, a pad printing process, a flexographic printing process, a hybrid offset lithography process, a intaglio printing process, and a die slot deposition process.

151. The method of embodiment 150, wherein the screen printing process comprises using a polyester screen.

152. The method of embodiment 150 or 151, wherein the screen printing process comprises using a polyamide screen.

153. The method of any one of embodiments 150 to 152, wherein the screen printing process comprises using a screen having a mesh size of about 110.

154. The method of any one of embodiments 150 to 153, wherein the screen printing process comprises using a screen having a mesh size of about 135.

155. The method of any one of embodiments 149 to 154, wherein the substrate comprises a conductive substrate or a non-conductive substrate.

156. The method of any one of embodiments 149 to 155, wherein the substrate comprises at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

157. The method of any one of embodiments 149 to 156, wherein curing the printed conductive ink comprises heating the printed conductive ink and the substrate to a temperature in a range from about 100° C. to about 200° C.

158. The method of any one of embodiments 149 to 156, wherein curing the printed conductive ink comprises heating the printed conductive ink and the substrate to a temperature in a range from about 130° C. to about 140° C.

159. The method of any one of embodiments 149 to 158, wherein curing the printed conductive ink comprises heating the printed conductive ink and the substrate for a duration from about 20 seconds to about 1 hour.

160. The method of any one of embodiments 149 to 158, wherein curing the printed conductive ink comprises heating the printed conductive ink and the substrate for a duration from about 3 minutes to about 10 minutes.

161. The method of any one of embodiments 149 to 160, wherein the nickel component comprises at least one of nickel flakes, nickel nano/microwires, and nickel spheres.

162. The method of embodiment 161, wherein the nickel flakes comprise a thickness of less than about 5 microns.

163. The method of embodiment 161 or 162, wherein the nickel flakes comprise a diameter of about 500 nanometers to about 30 microns.

164. The method of any one of embodiments 149 to 163, wherein the nickel component comprises a filamentary nickel powder.

165. The method of embodiment 164, wherein the filamentary nickel powder comprises a longest dimension in a range of about 2 microns to about 10 microns.

166. The method of any one of embodiments 149 to 165, wherein the nickel component comprises at least one particle having a longest dimension in a range of about 100 nanometers to about 50 microns.

167. The method of any one of embodiments 149 to 166, wherein the conductive ink comprises a carbon component.

168. The method of embodiment 167, wherein the carbon component comprises at least one of carbon flakes, carbon nano/microwires, and carbon spheres.

169. The method of embodiment 167 or 168, wherein the carbon component comprises at least one of graphene, graphite, activated carbon, carbon nanotubes, and carbon nanofibers.

170. The method of embodiment 169, wherein the graphene comprises graphene flakes.

171. The method of embodiment 170, wherein at least one of the graphene flakes comprises a diameter of about 5 microns.

172. The method of embodiment 170 or 171, wherein at least one of the graphene flakes comprises a diameter of about 100 nanometers to about 50 microns.

173. The method of any one of embodiments 169 to 172, wherein the graphite comprises a graphite powder.

174. The method of any one of embodiments 149 to 173, wherein the polyester component is formed from a polycarboxylic acid component and a polyol component.

175. The method of embodiment 174, wherein the polycarboxylic acid component comprises a dicarboxylic acid.

176. The method of embodiment 175 wherein the dicarboxylic acid at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, an octadecanedioic acid, a maleic acid, a fumaric acid, a glutaconic acid, a traumatic acid and a muconic acid.

177. The method of any one of embodiments 174 to 176, wherein the polycarboxylic acid component comprises a tricarboxylic acid.

178. The method of embodiment 177, wherein the tricarboxylic comprises at least one of a citric acid, an isocitric acid, an aconitic acid, a carballylic acid, a trimesic acid, and a terephthalic acid.

179. The method of any one of embodiments 174 to 178, wherein the polycarboxylic acid component comprises a hydroxicarboxilic acid.

180. The method of embodiment 179, wherein the hydroxicarboxilic acid comprises at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

181. The method of any one of embodiments 174 to 180, wherein the polyol component comprises at least one of a glycerol and a glycol.

182. The method of any one of embodiments 174 to 181, wherein the polyol component comprises at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

183. The method of any one of embodiments 149 to 182, wherein the conductive ink comprises an additive component.

184. The method of embodiment 183, wherein the additive component comprises at least one of a viscosity modifier, a wetting agent, a flow and leveling agent, an adhesion promoter, and a corrosion inhibitor.

185. The method of embodiment 184, wherein the wetting agent comprises a polyethylene glycol.

186. The method of embodiment 184 or 185, wherein the corrosion inhibitor comprises at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

187. The method of any one of embodiments 183 to 186, wherein the additive component comprises a solvent.

188. The method of embodiment 187, wherein the solvent comprises at least one of a viscosity modifier, a wetting agent, a flow and leveling agent and an adhesion promoter.

189. The method of embodiment 187 or 188, wherein the solvent comprises at least one of an alcohol and water.

190. The method of embodiment 189, wherein the alcohol comprises at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol.

191. The method of embodiment 190, wherein the N-propanol comprises at least one of a 1-propanol, a 2-propanol, and a 1-methoxy-2-propanol.

192. The method of embodiment 190, wherein the butanol comprises at least one of a 1-butanol and a 2-butanol.

193. The method of embodiment 190, wherein the pentanol comprises at least one of a 1-pentanol, a 2-pentanol, and a 3-pentanol.

194. The method of embodiment 190, wherein the hexanol comprises at least one of a 1-hexanol, a 2-hexanol, and a 3-hexanol.

195. The method of embodiment 190, wherein the N-octanol comprises at least one of a 1-octanol, a 2-octanol, and a 3-octanol.

196. The method of any one of embodiments 183 to 195, wherein the additive component comprises a butyl lactone.

197. The method of any one of embodiments 183 to 196, wherein the additive component comprises an ether.

198. The method of embodiment 197, wherein the ether comprises at least one of a methyl ethyl ether, a diethyl ether, an ethyl propyl ether, and a polyether.

199. The method of any one of embodiments 183 to 198, wherein the additive component comprises a ketone.

200. The method of embodiment 199, wherein the ketone comprises at least one of an acetone and a methyl ethyl ketone.

201. The method of embodiment 199 or 200, wherein the ketone comprises at least one of a diketone and a cyclic ketone.

202. The method of embodiment 201, wherein the cyclic ketone comprises at least one of a cyclohexanone, a cyclopentanone, a cycloheptanone, a cyclooctanone, a benzophenone, an acetylacetone, an acetophenone, a cyclopropanone, and an isophorone.

203. The method of any one of embodiments 183 to 202, wherein the additive component comprises an ester.

204. The method of embodiment 203, wherein the ester comprises at least one of a dibasic ester, an ethyl acetate, a dimethyl adipate, a proplyene glycol monomethyl ether acetate, a dimethyl glutarate, a dimethyl succinate, a glycerin acetate, and a carboxylate.

205. The method of any one of embodiments 183 to 204, wherein the additive component comprises a carbonate.

206. The method of embodiment 205 wherein the carbonate comprises a propylene carbonate.

207. The method of any one of embodiments 183 to 206, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, a teradecane, a styrene, a 1-vinyl-2-pyrolidone, a toluene, a pyridine, and a triethyl phosphate.

208. The method of any one of embodiments 149 to 207, wherein the conductive ink comprises a viscosity at 25° C. in a range from about 5,000 centipoise to about 11,000 centipoise.

209. The method of any one of embodiments 189 to 251, wherein the nickel component is in a range from about 50 wt % to about 60 wt %.

210. The method of any one of embodiments 189 to 251, wherein the nickel component is in a range from about 35 wt % to about 65 wt %.

211. The method of any one of embodiments 207 to 253, wherein the carbon component is in a range from about 0.5 wt % to about 2.5 wt %.

212. The method of any one of embodiments 207 to 253, wherein the carbon component is less than about 10 wt %.

213. The method of any of embodiments 226 to 258, wherein the additive component is less than about 10 wt %.

214. A method of fabricating a conductive ink, the method comprising:
dispersing a nickel component in a polyol component;
dispersing a polycarboxylic acid component in the polyol component, the polycarboxylic acid component and the polyol component being reactable to form a polyester component.

215. The method of embodiment 214, wherein dispersing the polycarboxylic acid component in the polyol component forms the polyester component in situ.
216. The method of embodiment 214 or 215, further comprising dispersing a carbon component in the polyol component.
217. The method of any one of embodiments 214 to 216, wherein dispersing the nickel component in the polyol component is before dispersing the polycarboxylic acid component in the polyol component.
218. The method of any one of embodiments 214 to 216, wherein dispersing the nickel component in the polyol component is after dispersing the polycarboxylic acid component in the polyol component.
219. The method of any one of embodiments 216 to 218, wherein dispersing the nickel component in the polyol component is before dispersing the carbon component in the polyol component.
220. The method of any one of embodiments 216 to 218, wherein dispersing the nickel component in the polyol component is after dispersing the carbon component in the polyol component.
221. The method of any one of embodiments 216 to 220, wherein dispersing the carbon component in the polyol component is before dispersing the polycarboxylic acid component in the polyol component.
222. The method of any one of embodiments 216 to 220, wherein dispersing the carbon component in the polyol component is after dispersing the polycarboxylic acid component in the polyol component.
223. The method of any one of embodiments 214 to 222, further comprising adding an additive component.
224. The method of embodiment 223, wherein adding the additive component is before dispersing the nickel component in the polyol component.
225. The method of embodiment 223, wherein adding the additive component is after dispersing the nickel component in the polyol component.
226. The method of any one of embodiments 223 to 225, wherein adding the additive component is before dispersing the polycarboxylic acid component in the polyol component.
227. The method of any one of embodiments 223 to 225, wherein adding the additive component is after dispersing the polycarboxylic acid component in the polyol component.
228. The method of any one of embodiments 223 to 227, wherein adding the additive component is before dispersing the carbon component in the polyol component.
229. The method of any one of embodiments 223 to 227, wherein adding the additive component is after dispersing the carbon component in the polyol component.
230. The method of any one of embodiments 214 to 229, wherein the conductive ink is printable onto a substrate.
231. The method of embodiment 230, wherein the substrate comprises a conductive substrate or a non-conductive substrate.
232. The method of embodiment 230 or 231, wherein the substrate comprises at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.
233. The method of any one of embodiments 214 to 232, wherein the nickel component comprises at least one of nickel flakes, nickel nano/microwires, and nickel spheres.
234. The method of embodiment 233, wherein the nickel flakes comprise a thickness of less than about 5 microns.
235. The method of embodiment 233 or 234, wherein the nickel flakes comprise a diameter of about 500 nanometers to about 30 microns.
236. The method of any one of embodiments 214 to 235, wherein the nickel component comprises a filamentary nickel powder.
237. The method of embodiment 236, wherein the filamentary nickel powder comprises a longest dimension in a range of about 2 microns to about 10 microns.
238. The method of any one of embodiments 214 to 237, wherein the nickel component comprises at least one particle having a longest dimension in a range of about 100 nanometers to about 50 microns.
239. The method of any one of embodiments 216 to 238, wherein the carbon component comprises at least one of carbon flakes, carbon nano/microwires, and carbon spheres.
240. The method of any one of embodiments 216 to 239, wherein the carbon component comprises at least one of graphene, graphite, activated carbon, carbon nanotubes, and carbon nanofibers.
241. The method of embodiment 240, wherein the graphene comprises graphene flakes.
242. The method of embodiment 241, wherein at least one of the graphene flakes comprises a diameter of about 5 microns.
243. The method of embodiment 241 or 242, wherein at least one of the graphene flakes comprises a diameter of about 100 nanometers to about 50 microns.
244. The method of any one of embodiments 240 to 243, wherein the graphite comprises a graphite powder.
245. The method of any one of embodiments 214 to 244, wherein the polycarboxylic acid component comprises a dicarboxylic acid.
246. The method of embodiment 245, wherein the dicarboxylic acid comprises at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, an octadecanedioic acid, a maleic acid, a fumaric acid, a glutaconic acid, a traumatic acid and a muconic acid.
247. The method of any one of embodiments 214 to 246, wherein the polycarboxylic acid component comprises a tricarboxylic acid.
248. The method of embodiment 247, wherein the tricarboxylic comprises at least one of a citric acid, an isocitric acid, an aconitic acid, a carballylic acid, a trimesic acid, and a terephthalic acid.
249. The method of any one of embodiments 214 to 248, wherein the polycarboxylic acid component comprises a hydroxicarboxilic acid.
250. The method of embodiment 249, wherein the hydroxicarboxilic acid comprises at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

251. The method of any one of embodiments 214 to 250, wherein the polyol component comprises at least one of a glycerol and a glycol.

252. The method of any one of embodiments 214 or 251, wherein the polyol component comprises at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

253. The method of any one of embodiments 223 to 252, wherein the additive component comprises at least one of a viscosity modifier, a wetting agent, a flow and leveling agent, an adhesion promoter, and a corrosion inhibitor.

254. The method of embodiment 253, wherein the wetting agent comprises a polyethylene glycol.

255. The method of embodiment 253 or 254, wherein the corrosion inhibitor comprises at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

256. The method of any one of embodiments 223 to 255, wherein the additive component comprises a solvent.

257. The method of embodiment 256, wherein the solvent comprises at least one of a viscosity modifier, a wetting agent, a flow and leveling agent and an adhesion promoter.

258. The method of any one of embodiment 256 or 257, wherein the solvent comprises at least one of an alcohol and water.

259. The method of embodiment 258, wherein the alcohol comprises at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol.

260. The method of embodiment 259, wherein the N-propanol comprises at least one of a 1-propanol, a 2-propanol, and a 1-methoxy-2-propanol.

261. The method of embodiment 259, wherein the butanol comprises at least one of a 1-butanol and a 2-butanol.

262. The method of embodiment 259, wherein the pentanol comprises at least one of a 1-pentanol, a 2-pentanol, and a 3-pentanol.

263. The method of embodiment 259, wherein the hexanol comprises at least one of a 1-hexanol, a 2-hexanol, and a 3-hexanol.

264. The method of embodiment 259, wherein the N-octanol comprises at least one of a 1-octanol, a 2-octanol, and a 3-octanol.

265. The method of any one of embodiments 223 to 264, wherein the additive component comprises a butyl lactone.

266. The method of any one of embodiments 223 to 265, wherein the additive component comprises an ether.

267. The method of embodiment 266, wherein the ether comprises at least one of a methyl ethyl ether, a diethyl ether, an ethyl propyl ether, and a polyether.

268. The method of any one of embodiments 223 to 267, wherein the additive component comprises a ketone.

269. The method of embodiment 268, wherein the ketone comprises at least one of an acetone and a methyl ethyl ketone.

270. The method of embodiments 268 or 269, wherein the ketone comprises at least one of a diketone and a cyclic ketone.

271. The method of embodiment 270, wherein the cyclic ketone comprises at least one of a cyclohexanone, a cyclopentanone, a cycloheptanone, a cyclooctanone, a benzophenone, an acetylacetone, an acetophenone, a cyclopropanone, and an isophorone.

272. The method of any one of embodiments 223 to 271, wherein the additive component comprises an ester.

273. The method of embodiment 272, wherein the ester comprises at least one of a dibasic ester, an ethyl acetate, a dimethyl adipate, a proplyene glycol monomethyl ether acetate, a dimethyl glutarate, a dimethyl succinate, a glycerin acetate, and a carboxylate.

274. The method of any one of embodiments 223 to 273, wherein the additive component comprises a carbonate.

275. The method of embodiment 274, wherein the carbonate comprises a propylene carbonate.

276. The method of any one of embodiments 223 to 275, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, a teradecane, a styrene, a 1-vinyl-2-pyrolidone, a toluene, a pyridine, and a triethyl phosphate.

277. The method of any one of embodiments 214 to 276, wherein the conductive ink has a viscosity at about 25° C. in a range from about 5,000 centipoise to about 11,000 centipoise.

278. The method of any one of embodiments 214 to 277, wherein the nickel component is in a range from about 50 wt % to about 60 wt %.

279. The method of any one of embodiments 214 to 277, wherein the nickel component is in a range from about 35 wt % to about 65 wt %.

280. The method of any one of embodiments 216 to 279, wherein the carbon component is in a range from about 0.5 wt % to about 2.5 wt %.

281. The method of any one of embodiments 216 to 279, wherein the carbon component is less than about 10 wt %.

282. The method of any of embodiments 214 to 281, wherein the polycarboxylic acid component is in a range from about 5 wt % to about 15 wt %.

283. The method of any of embodiments 214 to 282, wherein the polyol component is in a range from about 25 wt % to about 40 wt %.

284. The method of any of embodiments 214 to 282, wherein the polyol component is in a range from about 15 wt % to about 60 wt %.

285. The method of any of embodiments 223 to 284, wherein the additive component is less than about 10 wt %.

286. A printed conductive nickel film using a nickel ink fabricated according to a method of any one of embodiments 214 to 285.

287. A conductive nickel film of any one of embodiments 58 to 79, and 286, wherein the conductive film has a sheet resistance of less than about 1.5 Ohms per square per mil (Ohms/sq/mil).
288. The conductive nickel film of embodiment 287, wherein the conductive film has a sheet resistance of less than about 1.0 Ohms/sq/mil.
289. A conductive nickel film of any one of embodiments 58 to 79, and 286 to 288, wherein the conductive film has a surface roughness of less than about 10.
290. A conductive nickel film of any one of embodiments 58 to 79, and 286 to 289, wherein the conductive film has polar liquid phobicity.
291. The conductive nickel film of embodiment 290, wherein the conductive film has hydrophobicity.
292. A conductive nickel film of any one of embodiments 58 to 79, and 286 to 291, wherein the conductive film has an adhesion value of less than 3.
293. A conductive nickel film of any one of embodiments 58 to 79 and 286 to 292, wherein the conductive film has a viscosity of about 9,000 centipoise (cP) at a temperature of about 25° C.
294. A conductive ink comprising:
a nickel component;
a polycarboxylic acid component; and
a polyol component, the polycarboxylic acid component and the polyol component being reactable to form a polyester component.
295. The conductive ink of embodiment 294, wherein the nickel component comprises nickel flakes.
296. The conductive ink of embodiment 294 or 295, wherein the polycarboxylic acid component comprises glutaric acid and the polyol component comprises ethylene glycol.
297. The conductive ink of any one of embodiments 294 to 296, wherein a nickel film printed using the conductive ink has a sheet resistance of about 0.4 Ohms per square per mil (Ohms/sq/mil) to about 0.5 Ohms/sq/mil.
298. The conductive ink of any one of embodiments 294-297, further comprising a polar liquid phobicity additive.
299. The conductive ink of embodiment 298, wherein the polar liquid phobicity additive comprises dimer diamine.
300. The conductive ink of any one of embodiments 294 to 299, further comprising a printability enhancing additive.
301. The conductive ink of embodiment 300, wherein the printability enhancing additive comprises styrene.
302. The conductive ink of embodiment 300 or 301, wherein the printability enhancing additive further comprises a peroxide.
303. The conductive ink of embodiment 302, wherein the peroxide comprises at least one of a benzoyl peroxide, a 2-butanol peroxide, a 2,4-chlorobenzoyl peroxide, and a lauryl peroxide.
304. The conductive ink of any one of embodiments 294 to 303, wherein the polycarboxylic acid component comprises at least one of a maleic acid, a fumaric acid, a glutaconic acid, a traumatic acid and a muconic acid.
305. The conductive ink of any one of embodiments 294 to 304, wherein the polyol component comprises an unsaturated diol.
306. The conductive ink of any one of embodiments 294 to 305, wherein the polyester component comprises an unsaturated polyester component.
307. The conductive ink of any one of embodiments 294 to 306, wherein the conductive ink further comprises graphene flakes.
308. A method of fabricating a conductive ink, the method comprising:
dispersing a nickel component in a polyol component; and
dispersing a polycarboxylic acid component in the polyol component, the polycarboxylic acid component and the polyol component being reactable to form a polyester component.
309. The method of embodiment 308, wherein the polycarboxylic acid component comprises glutaric acid and the polyol component comprises ethylene glycol.
310. The method of embodiment 308 or 309, wherein the nickel component comprises nickel flakes.
311. The method of embodiment 310, further comprising removing nickel oxide from one or more surfaces of the nickel flakes.
312. The method of embodiment 311, wherein removing the nickel oxide comprises heating the nickel flakes in the presence of the polycarboxylic acid component.
313. The method of embodiment 312, wherein heating comprises heating the nickel flakes and the polycarboxylic acid component to a temperature of about 80° C. to about 120° C.
314. The method of any one of embodiments 308 to 313, further comprising adding a polar liquid phobicity additive.
315. The method of embodiment 314, wherein the polar liquid phobicity additive comprises dimer diamine.
316. The method of any one of embodiments 308 to 315, further comprising mixing the nickel component with mixing media for reducing a nickel component particle size, wherein the mixing media comprises beads.
317. The method of embodiment 316, wherein the beads comprise zirconia beads having a diameter of about 0.3 millimeters (mm) to about 10 mm.
318. The method of embodiment 317, further comprising mixing the nickel component with the zirconia beads for a duration of between about 1 hour and about 2 days.
319. The method of any one of embodiments 316 to 318, further comprising mixing the mixing media and the nickel component in a jar mill.
320. The method of embodiment 319, wherein the jar mill has a diameter of about 3 inches to about 15 inches.
321. The method of embodiment 319 or 320, further comprising rotating the jar mill at a rotation speed of about 50 revolutions per minute (RPM) to about 200 RPM.

What is claimed is:
1. A conductive ink comprising:
a conductive nickel component;
a conductive carbon component; and
a polar liquid phobicity additive.
2. The conductive ink of claim 1, wherein the conductive nickel component comprises nickel flakes.
3. The conductive ink of claim 2, wherein the nickel flakes comprise a longest dimension of 10 µm to 15 µm.
4. The conductive ink of claim 1, wherein the conductive carbon component comprises graphene flakes.
5. The conductive ink of claim 1, wherein the polar liquid phobicity additive comprises dimer diamine.
6. The conductive ink of claim 1, further comprising a printability enhancing additive.
7. The conductive ink of claim 6, wherein the printability enhancing additive comprises styrene.

8. The conductive ink of claim 6, wherein the printability enhancing additive comprises a peroxide.

9. The conductive ink of claim 8, wherein the peroxide comprises benzoyl peroxide.

10. The conductive ink of claim 8, wherein the peroxide comprises at least one of a 2-butanol peroxide, 2,4-chlorobenzoyl peroxide, and lauryl peroxide.

11. The conductive ink of claim 1, further comprising a polycarboxylic acid component and a polyol component, the polycarboxylic acid component and the polyol component being reactable to form a polyester component.

12. The conductive ink of claim 11, wherein the polycarboxylic acid component comprises glutaric acid and wherein the polyol component comprises ethylene glycol.

13. The conductive ink of claim 1, wherein a nickel film printed utilizing the conductive ink has a sheet resistance of 0.4 Ohms per square per mil (Ohms/sq/mil) to 0.5 Ohms/sq/mil.

14. A method of fabricating a conductive ink, the method comprising:
  providing a mixture comprising a conductive nickel component and a conductive carbon component; and
  dispersing a polar liquid phobicity component in the mixture.

15. The method of claim 14, wherein the conductive nickel component comprises nickel flakes.

16. The method of claim 15, further comprising removing nickel oxide from one or more surfaces of the nickel flakes.

17. The method of claim 16, wherein removing the nickel oxide comprises heating the nickel flakes in the presence of a polycarboxylic acid component to a temperature between 80° C. and 120° C.

18. The method of claim 15, wherein the polar liquid phobicity additive comprises dimer diamine.

19. The method of claim 15, further comprising mixing the conductive nickel component with mixing media and reducing a conductive nickel component particle size, wherein the mixing media comprises beads.

20. The method of claim 15, wherein providing the mixture comprises:
  dispersing the conductive nickel component in a polyol component;
  dispersing a polycarboxylic acid component in the polyol component, the polycarboxylic acid component and the polyol component being reactable to form a polyester component.

* * * * *